Feb. 8, 1966  G. W. DAVISON ET AL  3,234,377
VEHICLE CONTROL SYSTEM
Filed July 14, 1961  11 Sheets-Sheet 1
FIG. IA.
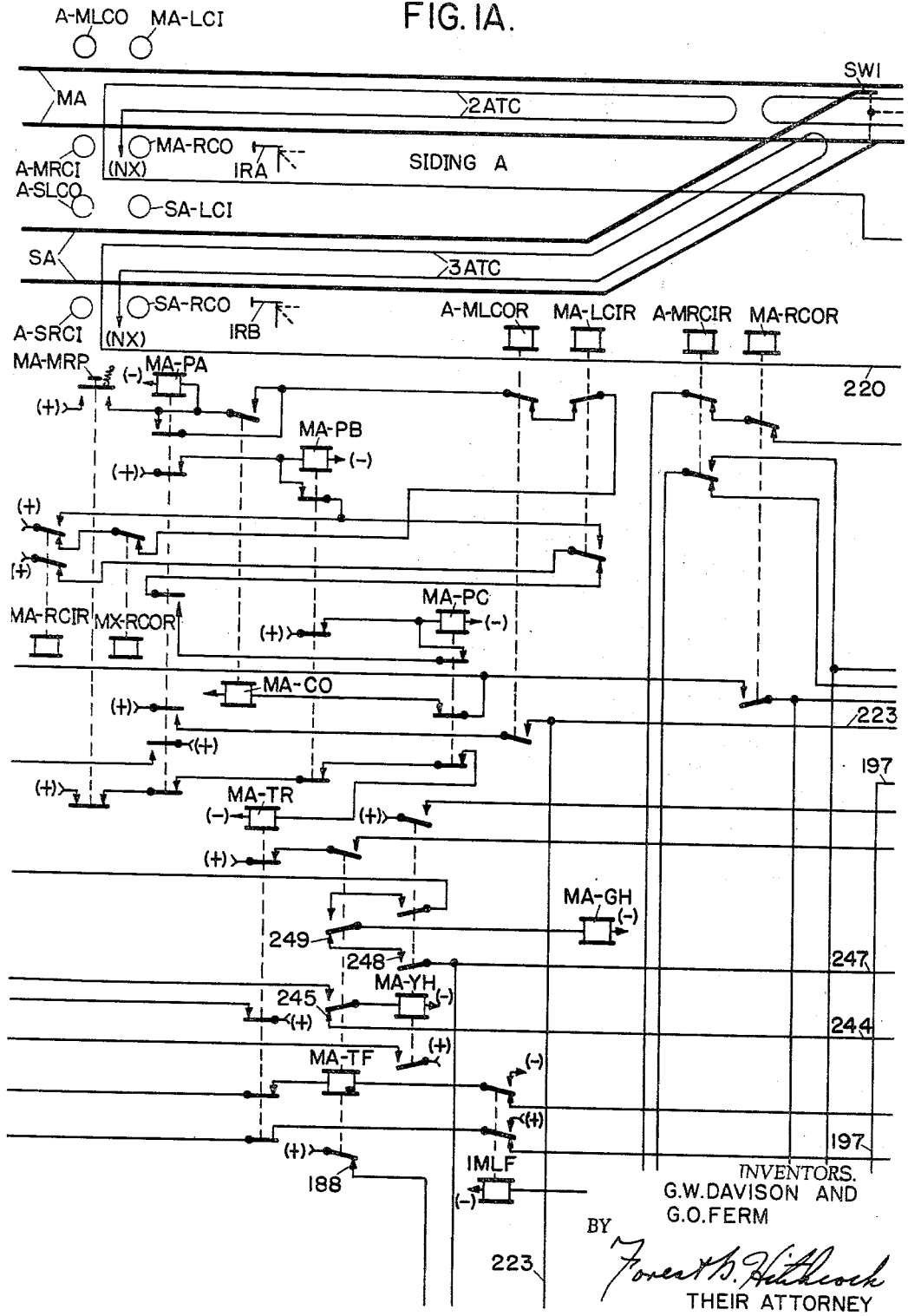
INVENTORS.
G.W. DAVISON AND
G.O. FERM
BY
Forest B. Hitchcock
THEIR ATTORNEY

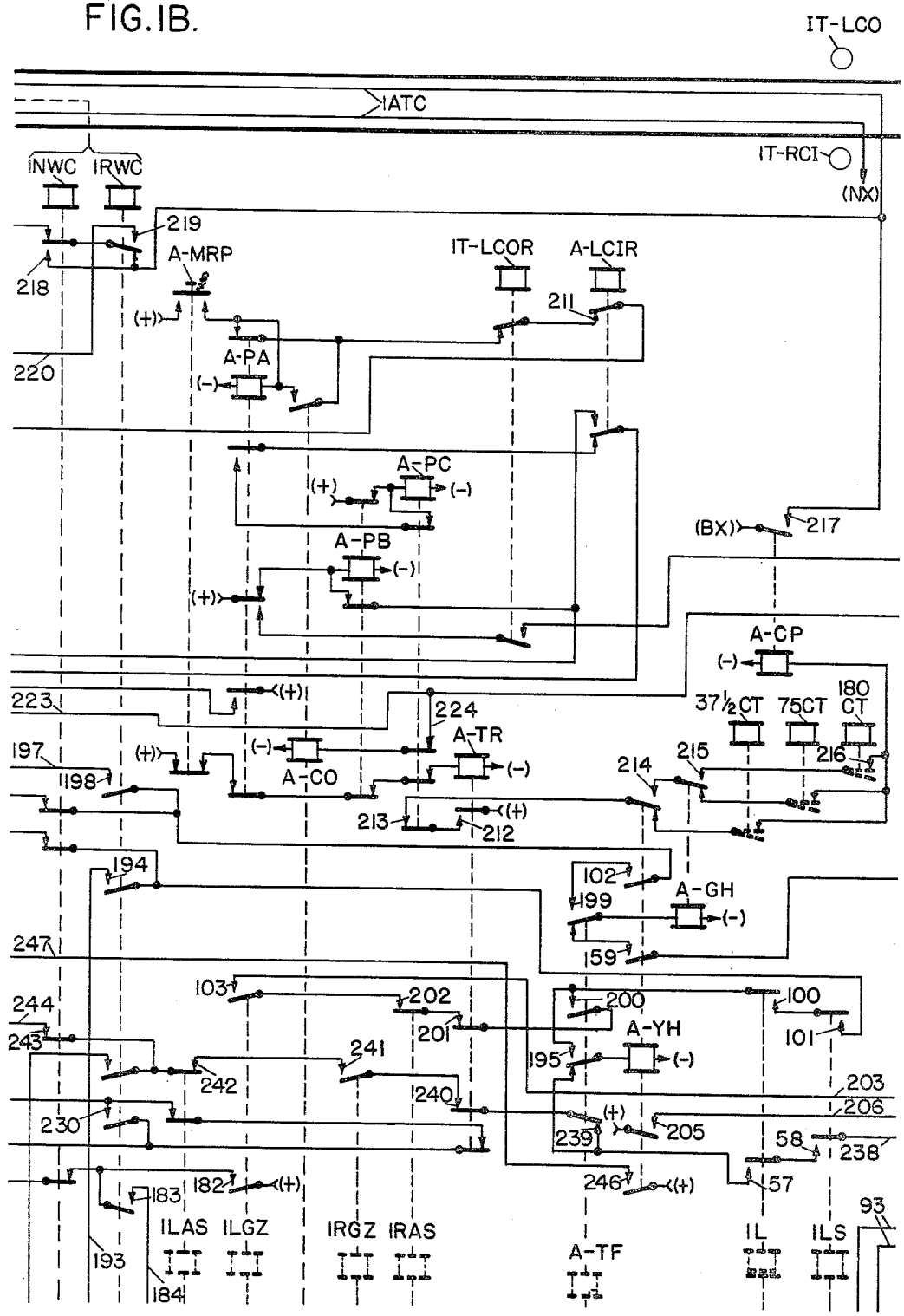

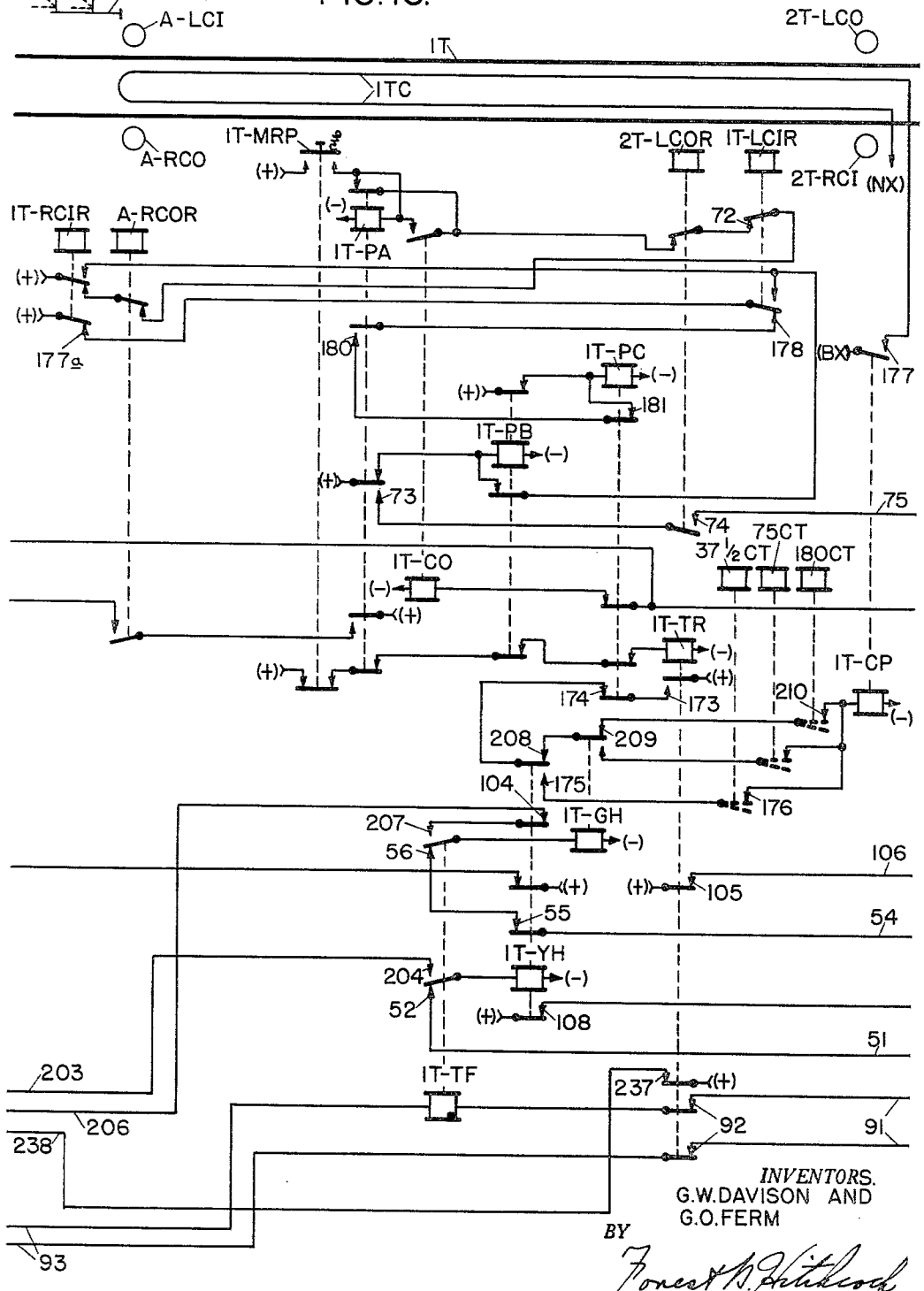

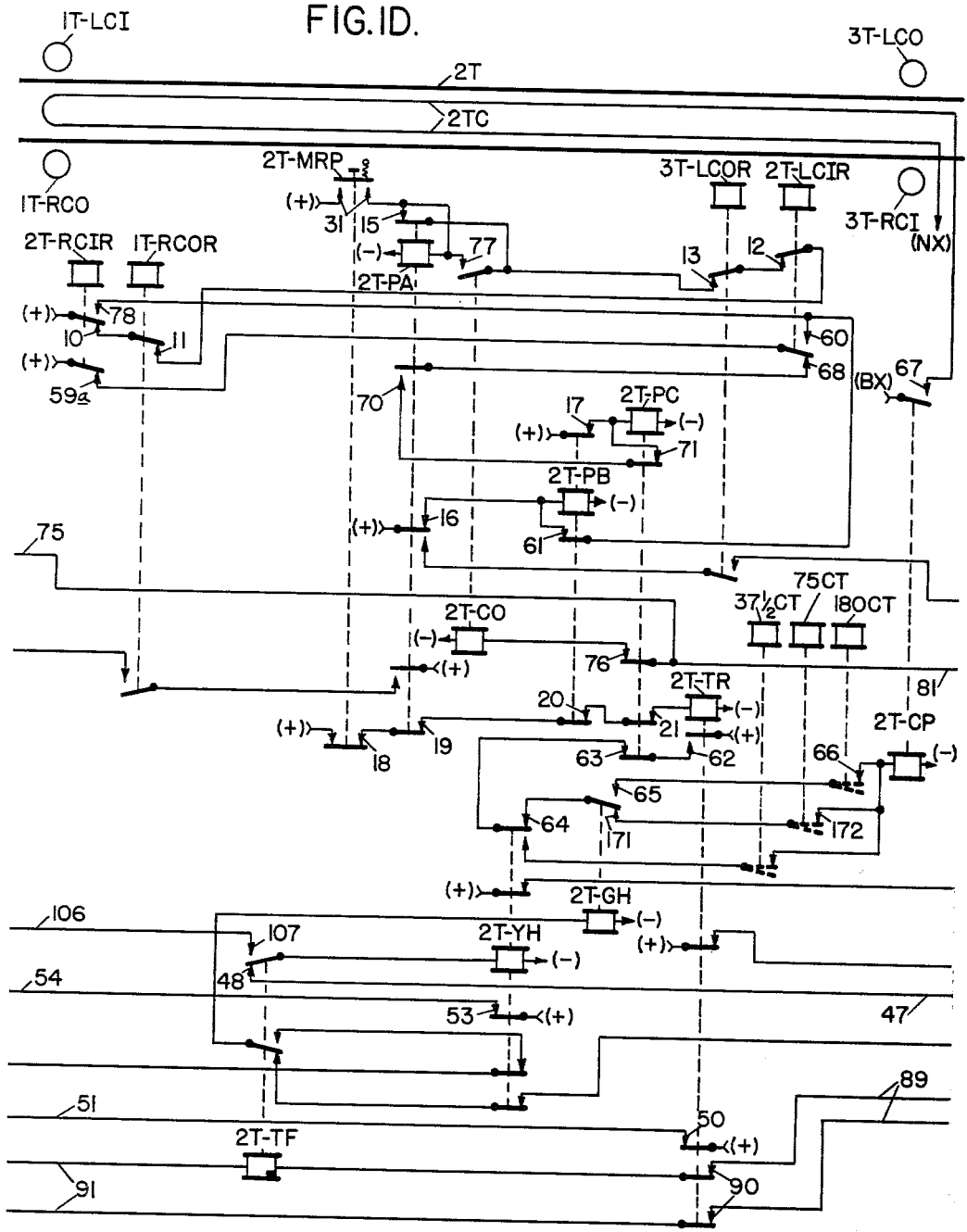

Feb. 8, 1966   G. W. DAVISON ET AL   3,234,377
VEHICLE CONTROL SYSTEM
Filed July 14, 1961   11 Sheets-Sheet 5
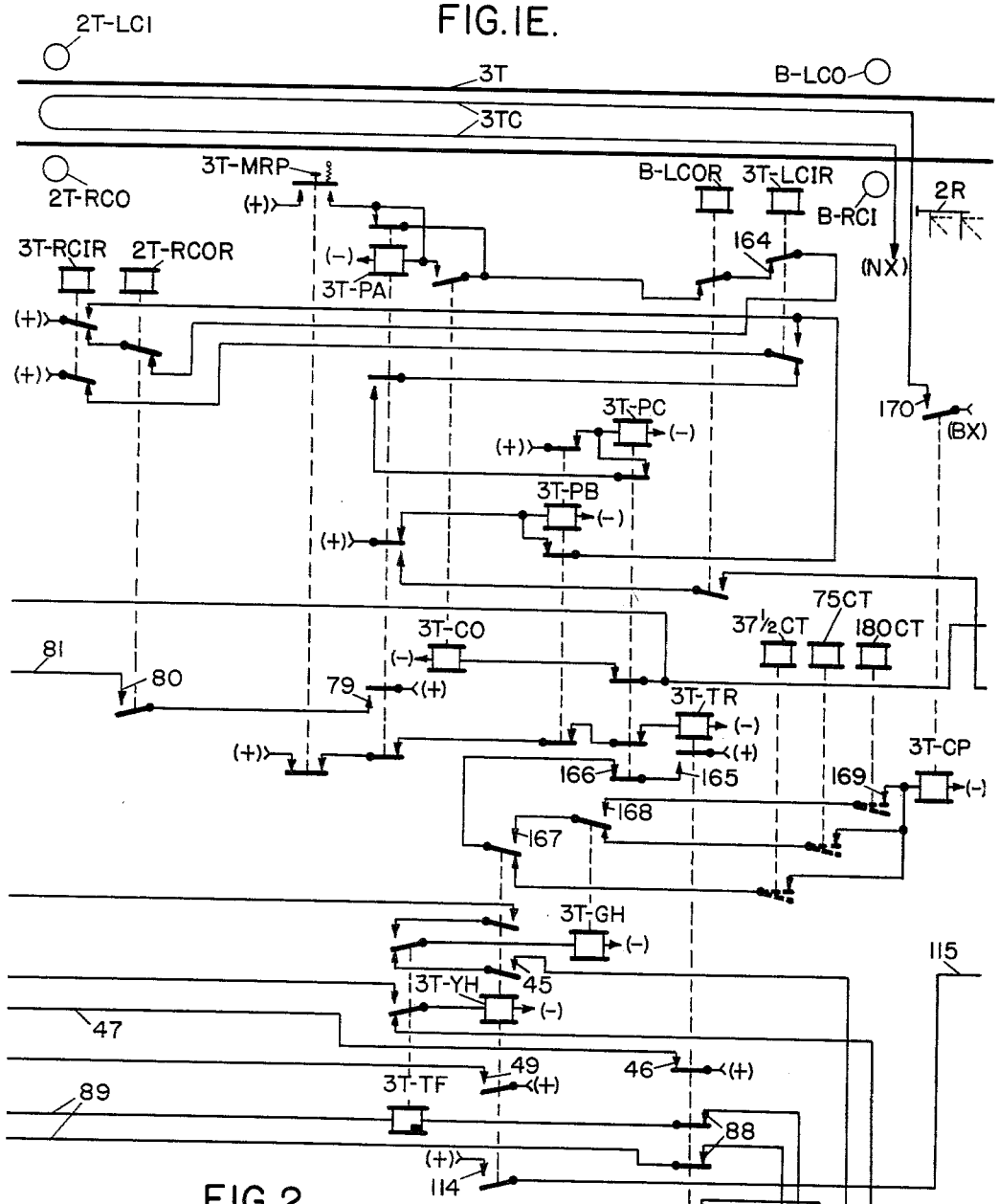
FIG. IE.
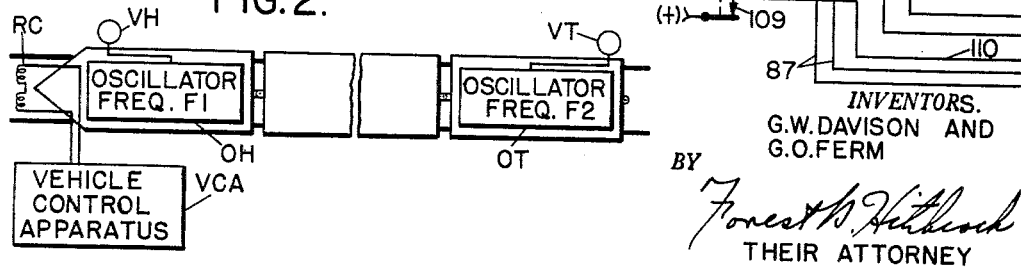
FIG. 2.
INVENTORS.
G.W. DAVISON AND
G.O. FERM
BY
Forest B. Hitchcock
THEIR ATTORNEY

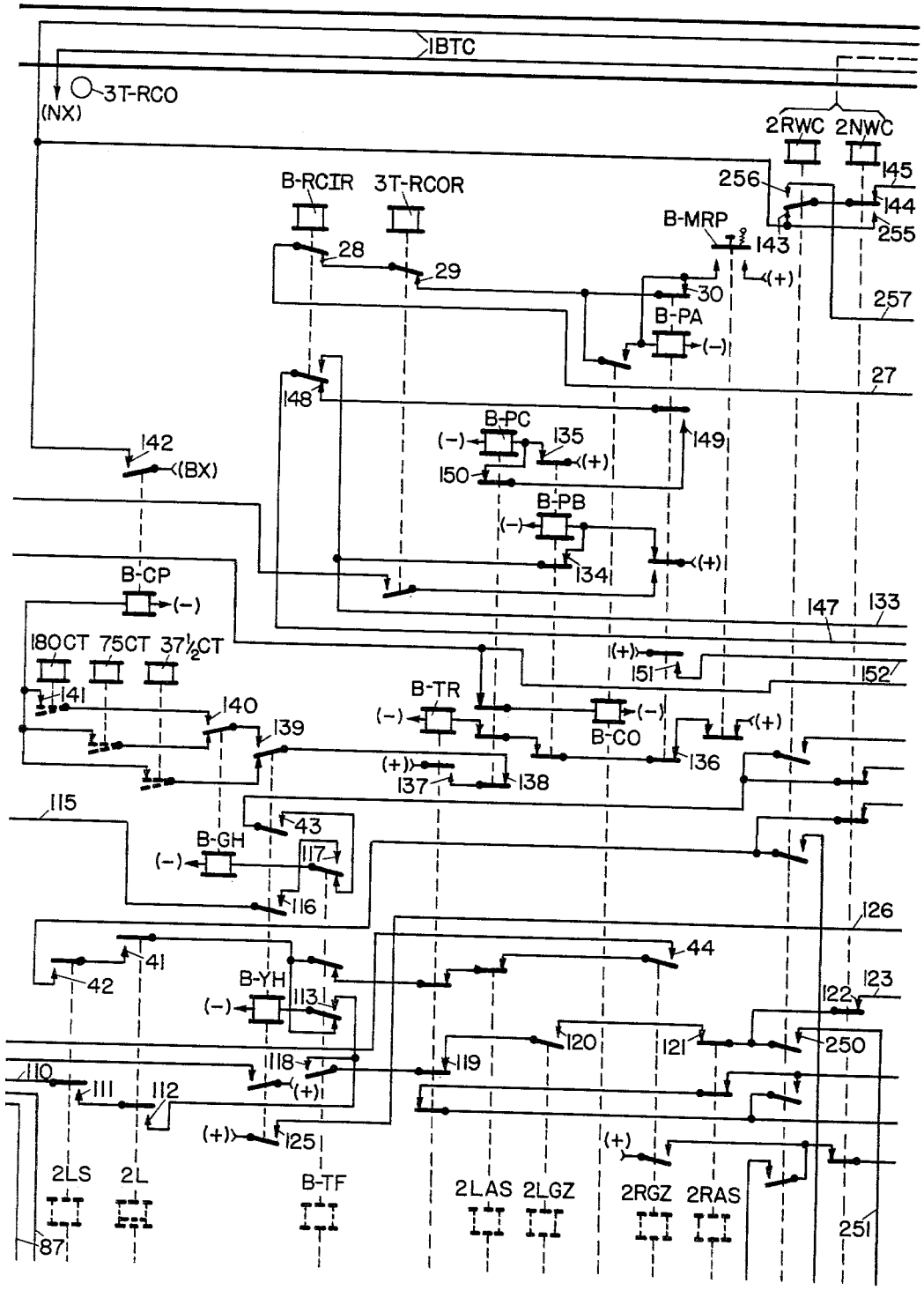
FIG. IF.

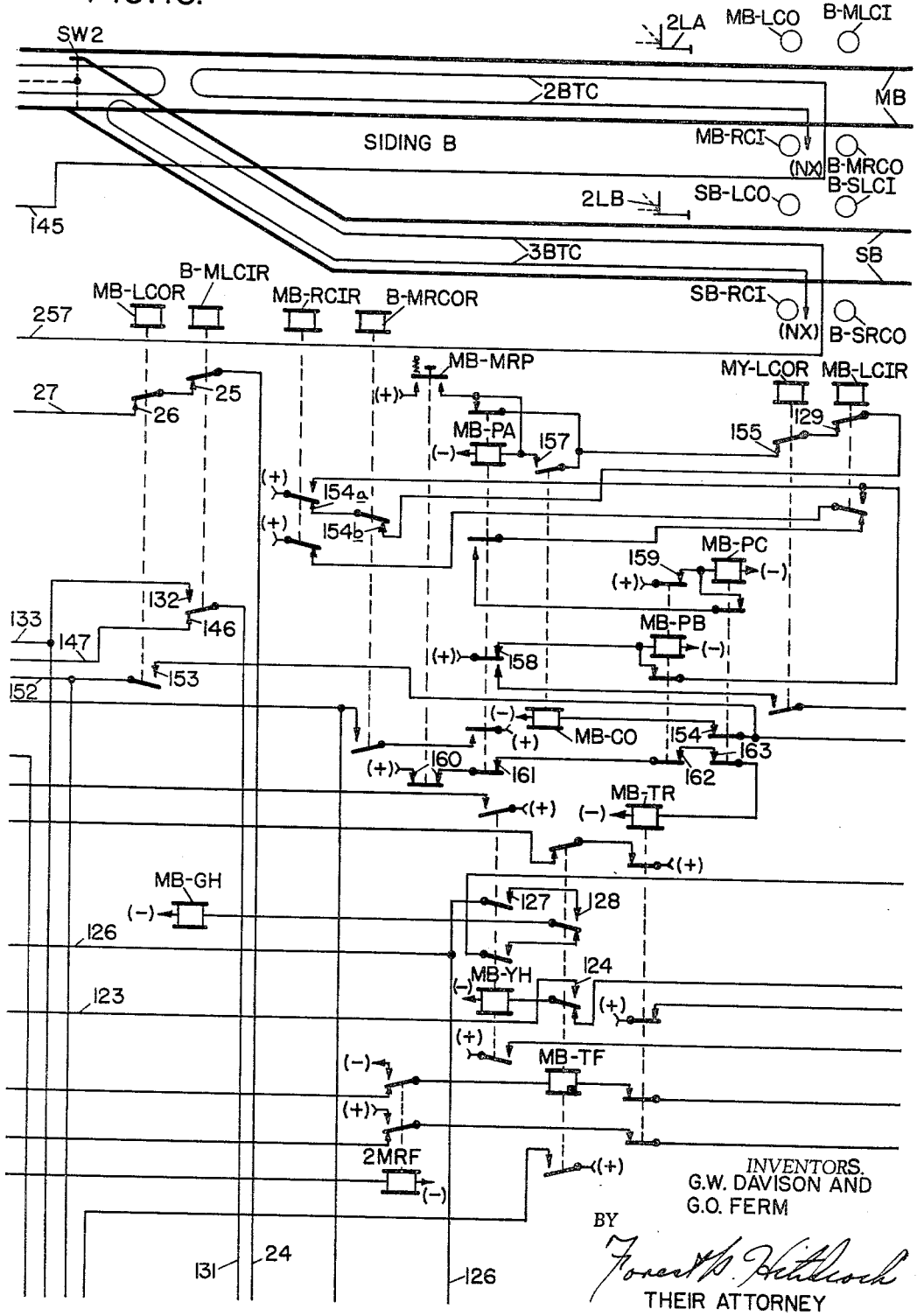

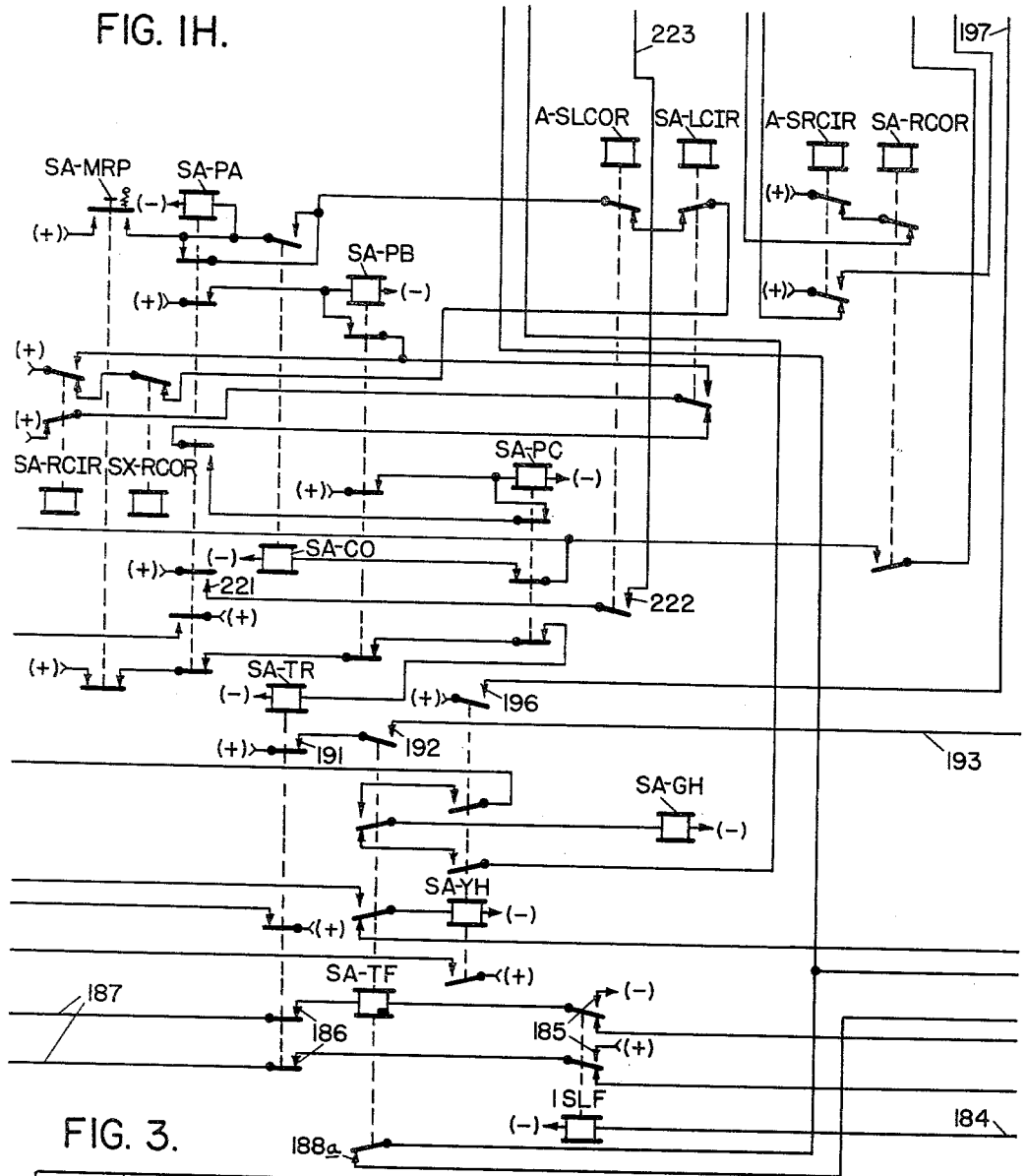

Feb. 8, 1966 G. W. DAVISON ET AL 3,234,377
VEHICLE CONTROL SYSTEM
Filed July 14, 1961 11 Sheets-Sheet 9

FIG. IJ.

INVENTORS.
G.W. DAVISON AND
G.O. FERM
BY
*Forest D. Hitchcock*
THEIR ATTORNEY

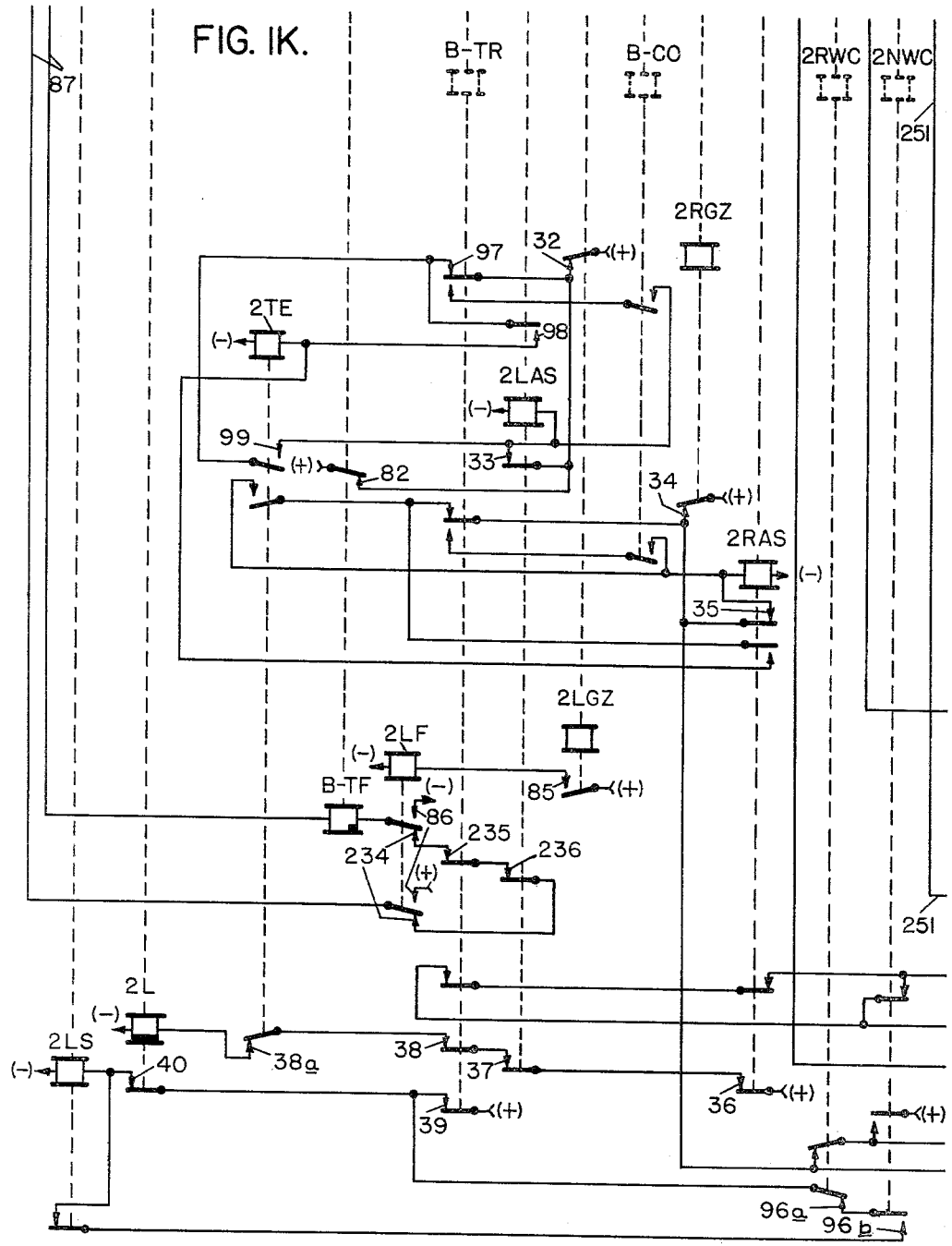

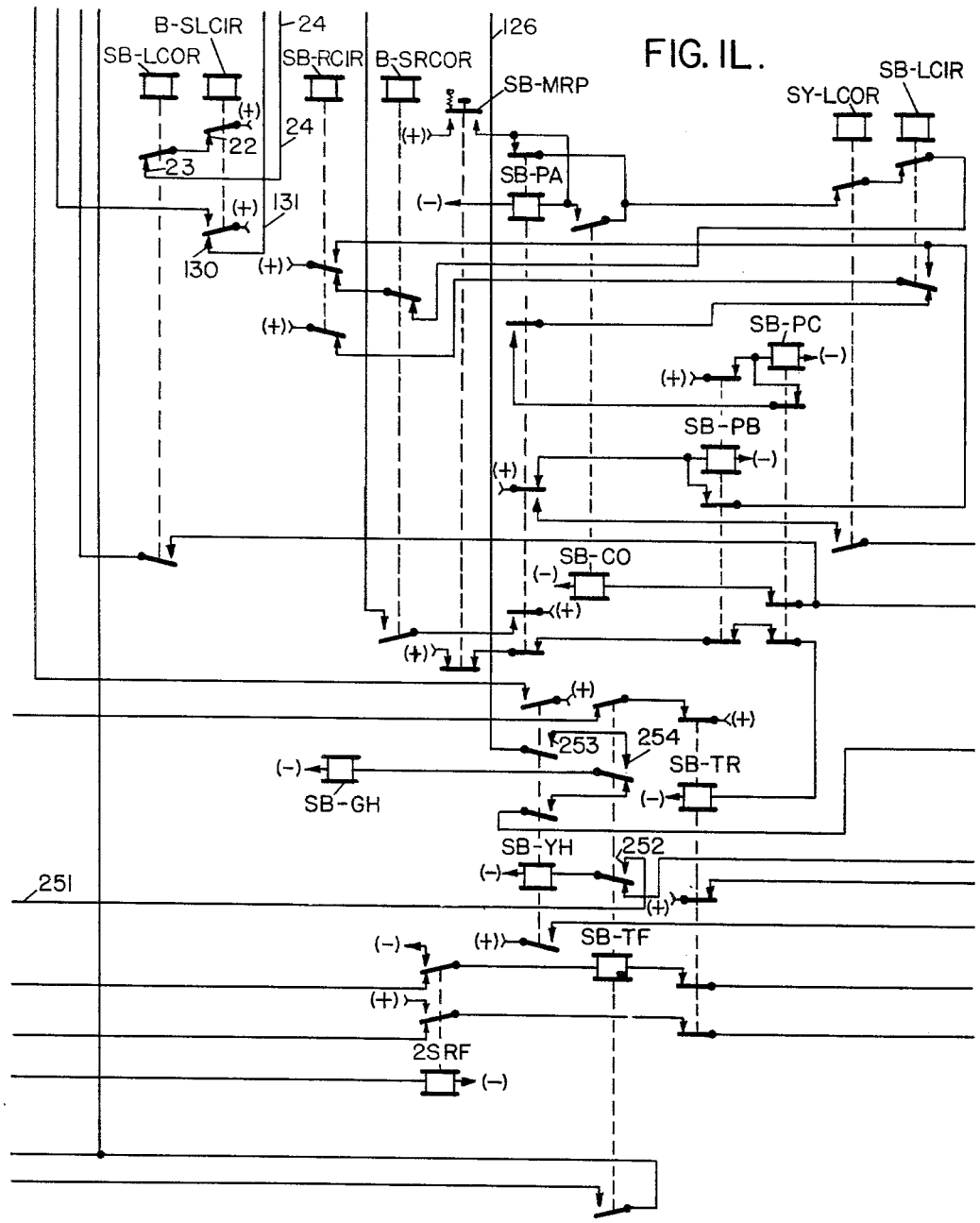

United States Patent Office 3,234,377
Patented Feb. 8, 1966

3,234,377
VEHICLE CONTROL SYSTEM
Gordon W. Davison and Glenn O. Ferm, Rochester, N.Y., assignors to General Signal Corporation, a corporation of New York
Filed July 14, 1961, Ser. No. 124,193
6 Claims. (Cl. 246—63)

This invention generally relates to vehicle control systems and more particularly pertains to the continuous control of vehicles for opposite directions of traffic over a stretch of right-of-way.

The control system of the present invention has particular utility in certain railway operations wherein it is desirable to provide continuous control of the railway vehicles, for opposite directions of vehicle travel, over a right-of-way. For example, as embodied in the present disclosure, the system of the present invention is particularly suitable for governing the operation of railway vehicles in opposite directions on a single track railroad wherein stretches the single track are utilized for both directions of vehicle travel.

In many of the previously proposed systems of continuous railway vehicle control, coded alternating current is applied to the track rails to be inductively received by receiving coils mounted on the locomotive of a vehicle traveling over the track rails. The rate at which this alternating current is coded, for application to the track rails, is dependent upon the track and/or traffic conditions existing in advance of the vehicle. Such track and/or traffic conditions are normally detected, in part, by track relays, which when deenergized indicate that the associated sections of the stretch of railway track are occupied and, in part, by certain other detecting means conditioned, for example, in accordance with the position of track switches etc. The received control codes are then utilized to provide automatic control of the vehicle throttle and brake mechanism and/or to provide visual indication to the engineman, of such advance conditions, through the medium of cab signalling.

When such previously proposed systems are utilized to provide control for both directions of traffic, over a single track, the direction of coding in the track rails; i.e. the direction of code transmission, is necessarily controlled in accordance with the desired direction of traffic. This is so because a railway vehicle normally shunts the track rails together and therefore, these coded alternating currents are transmitted in a direction opposite to that in which the vehicle is traveling. This shunting of the track rails, by the vehicle, is furthermore utilized, to deenergize the above mentioned track relays, so as to provide restrictive control for any following vehicle in order to maintain proper spacing between the vehicles, and also prevents the reception, on a following vehicle, of a control code intended solely for the preceding vehicle.

It has been observed in certain railway operations, however, such as mining operation, that the lightweight cars used may fail to afford the necessary degree of train shunt required for proper operation of the previously proposed control systems mentioned above. Furthermore, in certain other railway operations, such as a monorail system, a train shunt may not be involved. Therefore, the need exists for a continuous control system to control both directions of railway traffic wherein a shunting of the track rails, by the vehicles, is not required for proper operation of such a continuous control system.

Without attempting to define the exact scope of the present invention, it is proposed in accordance herewith to provide a continuous control system, for controlling the operation of vehicles in opposite directions of a stretch of right-of-way, wherein wayside loop circuit means, not shunted by the vehicles traveling thereover, are utilized to communicate various vehicle control codes, indicative of existing advance conditions, from the wayside to the vehicles, without requiring that these vehicle control codes be transmitted in a certain direction for a corresponding direction of vehicle traffic. As already mentioned, such directional code transmission is necessary when coded energy on the track rails is utilized as in the previously proposed continuous vehicle control systems mentioned above.

Another obvious advantage of utilizing wayside loop circuits, for providing wayside to vehicle control communication, is particularly evident in certain railway operations, such as mining operations, wherein the railway locomotives may at times pull and at other times push their connected trains. By employing loop circuits, as proposed in the present invention, wayside to locomotive communication is established independent of the locomotive location with respect to its connected train whereas, in the previously proposed control systems utilizing coded rail current, the receiver coils are normally mounted on the locomotives and therefore extra shifting means would be required to shift the point of code reception between the two ends of the vehicle, in order that the leading end would always inductively receive the coded rail currents normally transmitted in a direction opposite to that in which the vehicle is travelling.

In the present invention, it is furthermore proposed to provide means for detecting the davance conditions existing along the stretch of right-of-way in order that the vehicle control coding shall be distinctive of such advance conditions. However, since the system of the present invention is intended for operation wherein either a train shunt may not be reliable or no train shunt is involved, occupancy detecting means independent of any train shunt are provided, in accordance with the present invention, to properly register the location of each vehicle on the stretch of right-of-way so that proper restrictive control may be communicated to any following vehicle. For example, in the selected embodiment shown herein, check-in and check-out coils are disposed along the right-of-way to properly register vehicle occupancy along the stretch of right-of-way. As mentioned previously, this function was previously performed by track circuits and associated track relays which became deenergized when the associated sections of railway track became occupied with a railway vehicle.

In order that the vehicle control codes transmitted from the wayside to a vehicle will be indicative of conditions existing along the right-of-way, in advance of such vehicle, it is further proposed, in accordance with the present invention, to provide certain means conditioned in accordance with the preselected direction of vehicle traffic over the right-of-way which select control coding, distinctive of advance conditions along this direction, to be communicated to the vehicle while it is traveling over the stretch of right-of-way. For example, in the selected embodiment shown herein, magnetic stick type relays are employed which assume one or the other of their operating positions in accordance with the desired direction of traffic on a single track railroad and, being so positioned, cause the vehicle control codes communicated from the wayside to the railway vehicles, to be that which is distinctive of the conditions existing in advance of such railway vehicles.

In view of the above discussion, one object of the present invention is to provide a continuous control system for controlling the operation of vehicles in opposite directions over a stretch of right-of-way, wherein wayside loop circuits, not subjected to vehicle shunting, are utilized to communicate vehicle control codes, from the wayside to vehicles traveling over the stretch of right-of-way.

A further object of the present invention is to provide directive means, conditioned in accordance with the preselective direction of vehicle traffic over the stretch of right-of-way, for causing the vehicle control codes, communicated between the wayside and the vehicles traveling thereover, to be those distinctive of the existing conditions in advance of such vehicles.

A further object of the present invention is to properly register the location of vehicles on the stretch of right-of-way, without relying on such vehicle shunting, whereby proper restrictive vehicle controls are communicated to any following vehicles.

Other objects, purposes, and characteristic features of the present invention will in part be obvious from the accompanying drawings, and in part pointed out as the description of the invention progresses. In describing the invention in detail, reference will be made to the accompanying drawings in which:

FIGS. 1A through 1L (xcept that FIG. 1I has been omitted) illustrated a stretch of single track railroad equipped in accordance with one embodiment of the present invention.

FIG. 2 illustrates diagrammatically certain vehicle carried apparatus associated with the same embodiment of the present invention.

FIG. 3 is an arrangement diagram illustrating the proper arrangement of FIGS. 1A through 1L (with FIG. 1I omitted).

In order to simplify the illustration in the drawings and facilitate in the explanation of the fundamental characteristics of the invention, various parts and circuits have been shown diagrammatically in accordance with conventional symbols. Thus, the symbols (BX) and (NX) are employed to indicate the opposite terminals of a suitable source of alternating current and the symbols (+) and (−) are employed to indicate the opopsite terminals of a suitable source of direct current for the energization of the illustrated relays.

Referring now to the accompanying drawings, a right-of-way is shown, in the form of a portion of single track railroad having a stretch o fsingle track extending between passing siding A (FIG. 1A) and passing siding B (FIG. 1G). A track switch SW is then provided at each siding for selectively routing railway vehicles for either main line or siding moves, dependent upon supervisory switch controls transmitted from a control office (not shown).

The illustrated track layout is furthermore divided into distinct track sections formed by the positioning of wayside check-in and check-out coils CI and CO, to be described hereinafter, and are provided with wayside loop circuits TC which communicate vehicle control information, from the wayside to the railway vehicles as they travel over the associated sections of the illustrated track layout.

More specifically, the illustrated stretch of single track, extending between passing siding A and B, includes track sections 1T, 2T and 3T having associated wayside loop circuits 1TC, 2TC and 3TC respectively. Extending from each end of this illustrated single track is the usual OS detecting section, provided to detect when a railway vehicle is adjacent the associated track switch, to prevent operation of the switch under a vehicle. In order that vehicle control code may be communicated to vehicles traveling over the illustrated track switches, these OS sections are also provided with certain wayside loop circuits TC. Referring now to FIGS. 1A and 1B, the OS section associated with track switch SW1 is provided with wayside loop circuits 1ATC, 2ATC and 3ATC, whereas the OS section for track switch SW2 is provided with wayside loop circuits 1BTC, 2BTC and 3BTC of FIGS. 1F and 1G. To the left or westbound from the OS section associated with track switch SW1, the main and siding tracks of siding A include track sections MA and SA respectively and it should be understood that these tracks would also be provided with loop circuits, for wayside to vehicle communication, similar to those of the illustrated stretch of single track. Similarly, track sections MB and SB are the first track sections to the right or eastbound from the OS section for track switch SW2 of FIG. 1G.

Without attempting to limit the scope of the present invention, it is intended in this selected embodiment that the following vehicle controls and/or indications are involved in accordance with various control code rates utilized—

| Code rate: | Vehicle control |
|---|---|
| 180 | High speed. |
| 75 | Low speed. |
| 37½ | Service brake application. |
| No code | Emergency brake application. |

Obviously, both more and different code rates may be used, dependent upon the amount of actual vehicle control and/or indication required in practice, and the use of the four codes mentioned above, for providing four distinct vehicle controls and/or indications is merely to facilitate in the present disclosure of the invention.

In order to render the coding applied to each loop circuit dependent upon the conditions in advance of a railway vehicle, certain directional means have been provided which register the desired direction of traffic, called for by the control office, for each distinct move on the illustrated track layout. The condition of these directional means then determines whether vehicle control coding for an eastbound or westbound move should be applied to the illustrated wayside loop circuits TC, for communication to a railway vehicle traversing the illsutrated track layout. Thus, in the selected embodiment shown, magnetic stick type relays TF are provided which are selectively energized with current of one polarity or the other, to operate them to either one or the other of their two possible operating positions, in accordance with the desired direction of travel on the illustrated track layout. Being so positioned, these magnetic stick relays TF then cause the conditions in advance of a vehicle to determine the code rate to be applied to each of the illustrated wayside loop circuits TC. It should be furthermore pointed out that these relays TF remain in their last operated position when the energizing current to their respective windings has been removed.

In order to detect the location of the railway vehicles on the illustrated track layout, without relying on train shunt, inert tuned vehicle detecting coils CI and CO are positioned so as to divide the track layout into sections and are actuated, by certain vehicle carried apparatus, to be described hereinafter, to respectively detect when a vehicle is checking into and out of the illustrated track sections. For example, referring to FIGS. 1C, 1D and 1E, westbound vehicles are checked into track section 2T at coil 2T–LCI of FIG. 1E, and, are checked out at coil 2T–LCO of FIG. 1C. Similarly, eastbound vehicles are checked in and out of section 2T at coils 2T–RCI and 2T–RCO respectively, of FIGS. 1C and 1E respectively.

Associated with each of the illustrated track sections is an occupancy detecting relay TR which becomes deenergized, as will be described hereinafter, whenever the associated track section is occupied by a railway vehicle, as detected by the check-in and check-out coils CI and CO. This occupancy detecting relay TR is then utilized to perform certain functions of the conventional track relay without requiring the use of track circuits; i.e. without requiring that a railway vehicle shunt the rails of a section together. As previously mentioned, this is desirable in applications where a train shunt is not involved, or in certain railway operations wherein lightweight railway cars are utilized and the degree of shunting afforded by such lightweight cars may be insufficient to properly register the location of a railway vehicle and therefore may be insufficient for proper operation of a control system. These occupancy detecting relays TR are thus utilized to initiate the vehicle control coding of the associated wayside loop circuits TC and furthermore are utilized to insure proper restrictive controls for any following moves, in order to maintain proper spacing between the various vehicles utilizing the illustrated track layout.

Referring now to FIG. 2 of the accompanying drawings, certain vehicle carried apparatus is illustrated for operation with the wayside apparatus, just described, and in accordance with vehicle control codes communicated from the wayside to the vehicles, by the above mentioned loop circuits TC. More specifically, receiver coils RC inductively pick up the coding present in the loop circuits, as a vehicle travels over the associated track sections, and these received control codes are then decoded and utilized by the vehicle control apparatus VCA, shown in FIG. 2, to control operation of the railway vehicle. As previously mentioned, it is intended here that such vehicle control apparatus VCA may be of any suitable form which provides automatic control of the vehicle throttle and brake mechanism and/or which provides visual indication to an engineman of such designated vehicle controls, in accordance with the received control codes. It will be noted that, since the illustrated wayside loop circuits TC are not shunted by a railway vehicle traveling on the illustrated track layout, receiver coils RC of FIG. 2 can inductively receive the vehicle control codes communicated by loop circuits TC, irrespective of their location on a railway vehicle. As mentioned previously, this is desirable in certain railway applications wherein a locomotive may sometimes push and at other times pull its connected train.

A railway vehicle, in accordance with the selected embodiment, furthermore carries certain transmitting units, at its respective ends, each of which transmits a frequency distinctive of that particular end of the vehicle. Thus, oscillator unit OH is mounted on the illustrated vehicle and transmits a frequency F1 which is distinctive of the head end of the illustrated railway vehicle, while vehicle carried oscillator unit OT transmits a frequency F2 which is distinctive of the tail end of the illustrated vehicle. This frequency F1, distinctive of the head end of the illustrated railway vehicle, is then applied to transmitting coil VH to selectively actuate the appropriate check-in coils CI (tuned to frequency F1) as the head end of the vehicle passes these wayside check-in coils during movement of the railway vehicle in the illustrated track layout. Similarly, frequency F2 distinctive of the tail end of the illustrated railway vehicle, is applied to transmitting coil VT for selectively actuating appropriate check-out coils CO (tuned to frequency F2) as the tail end of the illustrated vehicle passes these wayside check-out coils. It is of course assumed here that a railway vehicle, traveling in a given direction on the illustrated track layout, will only actuate the check-in and check-out coils CI and CO associated with that direction and not actuate the corresponding coils for the opposite direction of traffic. Furthermore, although only two frequencies F1 and F2 have been discussed, for identifying the respective ends of the railway vehicles, for both direction of traffic, it should be understood that, if desired, frequencies F1 and F2 could be utilized for identifying the respective ends of the vehicles for one direction of vehicle traffic and additional frequencies, such as F3 and F4, could be utilized to identify the respective ends of the vehicles for the opposite direction of vehicle traffic. In this latter case, the westbound check-in coils might be tuned to frequency F1, the westbound check-out coils might be tuned to frequency F2 and the eastbound check-in and check-out coils might then be tuned to frequencies F3 and F4 respectively.

Certain wayside signals have been shown in the accompanying drawings, at the usual locations, for controlling the respective vehicle movements at sidings A and B. More specifically, wayside signals 1RA or 1RB of FIG. 1A control the left hand or eastbound entrance onto the illustrated stretch of single track, for main line and siding moves respectively, whereas signal 1L of FIG. 1C controls the westbound departure of railway vehicles from the illustrated stretch of single track. Similarly, signals 2LA and 2LB of FIG. 1G control the right hand or westbound entrance of vehicles onto the illustrated stretch of single track, whereas signal 2R of FIG. 1E controls the eastbound departures from the illustrated stretch of single track, toward the siding B.

These various wayside signals are then cleared in accodance with supervisory control established by a central control office such as is utilized in a centralized traffic control system or the like. Thus, referring to FIGS. 1J and 1K, the usual signal clearing relays GZ are employed for selectively clearing the illustrated wayside signals. Furthermore, although the energizing circuits by which each of the illustrated wayside signals are cleared have not been shown in detail, in the accompanying drawings, it is assumed here that these various wayside signals are properly interlocked, in accordance with usual signalling practice well known to those skilled in the art, so that two opposing signals cannot be cleared at the same time.

However, since the system of the present invention is intended for governing of the operation of unmanned as well as manned vehicles, it should be obvious, in the case of unmanned vehicle control, that no wayside signalling is required and that the above mentioned exit and entrance control is then accomplished by applying the proper vehicle control coding to the appropriate wayside lope circuits, and therefore, the directional magnetic stick relays TF, shown in the accompanying drawings, are properly interlocked so that only a single direction of traffic can be established, at any given time, on the illustrated stretch of single track. Such control for unmanned vehicles will be discussed in detail hereinafter. In view of the above, it should therefore be understood at this time that the illustration of these wayside signals is merely to facilitate in the present disclosure of the invention rather than to limit the number of forms which it may assume.

Having thus described the general organization of the selected embodiment of the present invention, a detailed discussion of the operation of the illustrated apparatus will now be set forth.

NORMAL CONDITIONS

Before beginning a detailed description of the system operation, it is first desirable to establish the normal operating conditions for the illustrated circuit organizations. Thus, the accompanying drawings illustrate those conditions which are assumed to be normal with no vehicles occupying the illustrated track layout, no vehicle moves presently being called for by the supervisory control office and the directional magnetic stick relays TF in that position corresponding to the last direction of traffic assumed to have taken place on the illustrated track layout.

In the accompanying drawings, it will be noted that each of the illustrated track sections is provided with substantially the same relay circuit organization including relays PA, PB, PC, TR and CO. In order to illustrate how the normal operating conditions are established for the illustrated circuit organizations, a detailed description for establishing these normal operating conditions will be set forth for the apparatus associated with track section 2T of FIG. 1D, and, since all the other track sections are similarly equipped, the establishment of the normal operating conditions for these other track sections should be obvious from the description for track section 2T.

Referring now to FIG. 1D of the accompanying drawings, relay 2T–PA is normally maintained in its picked up position by a stick circuit extending from (+), through back contacts 10 and 11 of relays 2T–RCIR and 1T–RCOR respectively, back contacts 12 and 13 of relays 2T–LCIR and 3T–LCOR respectively, front contact 15 of relay 2T–PA, and to (−). Relay 2T–PB is then maintained normally picked up through front contact 16 of relay 2T–PA, and, relay 2T–PC is also normally picked up through front contact 17 of relay 2T–PB. With relays 2T–PA, 2T–PB and 2T–PC thus normally picked up, occupancy detecting relay 2T–TR is also normally picked up by a circuit extending from (+), through the normally closed contacts 18 of push button 2T–MRP, front contacts 19, 20 and 21 of relays 2T–PA, 2T–PB and 2T–PC respectively, and to (−). As mentioned earlier, this occupancy detecting relay 2T–TR is utilized to perform functions similar to those of the conventional track relay without requiring the use of track circuits; i.e. without requiring a shunting together of the track rails of a track section.

The OS sections associated with each end of the illustrated stretch of single track are provided with corresponding PA, PB, PC, TR and CO relays. Of these, relays PB, PC and TR are normally maintained in a picked up position by circuits similar to those already described for track section 2T of FIG. 1D. However, the circuit by which the relays PA, associated with the OS sections, are normally picked up is somewhat different and extends, for example, for relay B–PA of FIG. 1F, from (+) in FIG. 1L, through back contact 22 of relay B–SLCIR, back contact 23 of relay SB–LCOR, along wire 24 between FIGS. 1L and 1G, back contacts 25 and 26 of relays B–MLCIR and MB–LCOR respectively, along wire 27 between FIGS. 1G and 1F, back contacts 28 and 29 of relays B–RCIR and 3T–RCOR respectively, front contact 30 of relay B–PA, and to (−).

It should be pointed out at this time that the above discussed normal conditions are automatically assumed by the wayside circuit organization, associated with the various sections when the sections are unoccupied, as will be discussed hereinafter. However in order to establish these normal operating conditions, when placing the system in service, manual push buttons MRP have been provided at each of the illustrated track sections for initially picking up the associated PA relay which in turn cause the remaining relays associated with a given section to assume their normal operating conditions just described. Thus, referring to FIG. 1D, relay 2T–PA is picked up, when placing the apparatus for track section 2T into service, by the depression of push button 2T–MRP which completes an energizing circuit for relay 2T–PA extending from (+) in FIG. 1D, through contacts 31 of push button 2T–MRP, and to (−).

Referring now to FIGS. 1J and 1K of the accompanying drawings, each of the illustrated signal locations is provided with approach relays LAS and RAS which are normally picked up until the associated signal is cleared by the picking up of an associated signal clearing relay GZ from the control office. Thus, referring to FIG. 1K, relay 2LAS is normally maintained in a picked up position by a stick circuit extending from (+), through back contact 32 of relay 2LGZ, front contact 33 of relay 2LAS, and to (−). Similarly, relay 2RAS of FIG. 1K is normally maintained in a picked up position by a stick circuit extending from (+), through back contact 34 of relay 2RGZ, front contact 35 of relay 2RAS, and to (−). Furthermore, approach relays 2LAS and 2RAS are also provided with additional stick circuits, to be described hereinafter, which insure that these relays are dropped away, upon pick up of the associated signal clearing GZ relay, only if conditions are favorable for the desired vehicle move; i.e. the route is available and the proper traffic direction is established. Referring to FIG. 1J, relays 1RAS and 1LAS are also provided with similar stick circuits and are normally maintained picked up by those stick circuits completed through back contacts of the associated signal clearing relays 1RGZ and 1LGZ respectively.

Referring to FIG. 1K, with relays 2LAS and 2RAS picked up, as described above, relay 2L is also normally picked up by a circuit extending from (+), through front contacts 36, 37 and 38 of relays 2RAS, 2LAS and B–TR respectively, check contact 38a of time element relay 2TE, and to (−). Furthermore, relay 2LS is also normally picked up by a circuit extending from (+), through front contact 39 of relay B–TR, front contact 40 of relay 2L, and to (−). This relay 2LS controls the locking and unlocking of track switch SW2, of FIG. 1G; i.e., when relay 2LS is in its picked up position it unlocks track switch SW2 so that it may be positioned in accordance with the desired routing of vehicles at siding B, and, when relay 2LS is in its deenergized position it locks track switch SW2 to prevent any change in the position of this track switch SW2. Similarly, relays 1L and 1LS of FIG. 1J are also normally picked up by similar circuits to those just described for relays 2L and 2LS, and relay 1LS performs the similar locking and unlocking control of track switch SW1 of FIG. 1A.

As previously mentioned, the illustrated directional magnetic stick relays TF remain in their last operated position, corresponding to the last direction of traffic on the illustrated track layout. Assuming now that the last traffic on the illustrated track layout was in the eastbound direction, or left to right in the accompanying drawings, each of the illustrated relays TF are in their dropped away position corresponding to this assumed previous eastbound traffic. This relay registration of a desired direction of traffic, by selective energization of the directional magnetic stick relays TF, and the retainment of these relays TF in their last operated position, will be described in detail hereinafter.

Since eastbound traffic was the last to utilize the illustrated track layout and since the directional magnetic stick relays TF are therefore in their dropped away position, the relays YH and GH associated with each of the illustrated track sections are then selectively energized in accordance with the conditions existing to the right of or eastbound from, that track section. More specifically, the eastbound energizing circuits for the relays YH and GH, associated with each of the illustrated track sections, extend through back contacts of the associated directional magnetic stick relay TF, whereas the westbound energizing circuits for these relays YH and GH extend through front contacts of the associated directional magnetic stick relay TF.

The various code rates utilized in the selected embodiment of the present invention are developed by code transmitters CT associated with each of the illustrated track sections. Dependent upon the positions of the YH and GH relays, associated with a given track section, code repeater relay CP is then selectively energized at either a 180, 75 or 37½ code rate to cause energization of the loop circuit TC, associated with that track section, in accordance with the advanced conditions existing along preselected direction traffic. However, it wil be noted in the drawings that the energizing circuits for the various code repeater relays CP are completed through a back contact of the associated occupancy detecting relay TR so that the selected code rate is only applied to the wayside loop circuits TC, when the associated track sections become occupied.

More specifically, for a given track section, if relays YH and GH are both dropped away, the energizing circuit for the associated code repeater relay CP will be conected so as to select a 37½ code rate to be applied to the associated loop circuit TC. However, if relay relay 2T–LCIR then returns to its normal deenergized position, relay 2T–PA remains in its present dropped away position until this westbound vehicle has been properly checked out of track section 2T, as will be described hereinafter. Furthermore, when relay 2T–LCIR drops away, the above described stick circuit for relay 2T–PB is interrupted at front contact 60 of relay 2T–LCIR and therefore relay 2T–PB is dropped away. Relay 2T–PC however is now maintained in its normal picked up position by a stick circuit extending from (+), through back contact 59a of relay 2T–RCIR, back contact 68 of relay 2T–LCIR, back contact 70 of relay 2T–PA, front contact 71 of relay 2T–PC, and to (—). The purpose of this relay 2T–PC is to remove any code from loop circuit 2TC in the event that a following vehicle enters track section 2T before preceding vehicle is properly checked out. This operation will be described in detail hereinafter.

Assuming now that this westbound vehicle passes wayside coils 1T–LCI, relay 1T–LCIR of FIG. 1C is momentarily energized to open its back contact 72 and thereby interrupts the existing stick circuit for relay 1T–PA to initiate the checking in, of this westbound vehicle, at track section 1T of FIG. 1C. In a similar manner to that just described, loop circuit 1TC is then energized at a vehicle control code rate depending the existing operating position of relays 1T–YH and 1T–GH, which in turn are dependent upon the advance conditions existing to the left or westbound from track section 1T.

Assuming now that these advance conditions are such that the assumed westbound vehicle may continue over the illustrated stretch of single track, wayside check out coil 2T–LCO of FIG. 1C will be momentarily actuated, as the tail end vehicle coil VT on the westbound vehicle passes, to momentarily energize the associated relay 2T–LCOR of FIG. 1C. When this occurs, check-out relay 2T–CO of FIG. 1D is now energized by a circuit extending from (+) in FIG. 1C, through back contact 73 of relay 1T–PA, front contact 74 of relay 2T–LCOR, along wire 75 between FIGS. 1C and 1D, through front contact 76 of relay 2T–PC, and to (—). This picking up of check-out relay 2T–CO properly checks the assumed westbound vehicle out of track section 2T and thereby causes relay 2T–PA to pick up by a circuit extending from (+), through back contacts 10, 11, 12 and 13 of relays 2T–RCIR, 1T–RCOR, 2T–LCIR and 3T–LCOR respectively, front contact 77 of relay 2T–CO, and to (—). Once relay 2T–PA is thus picked up, it will be maintained in its normal picked up position, even though check-out relay 2T–CO is subsequently dropped away, by the illustrated stick circuit which includes front contact 15 of relay 2T–PA in multiple with front contact 77 of relay 2T–CO. Relay 2T–PB is now also returned to its normal energized position by the previously described energizing circuit including front contact 16 of relay 2T–PA. By referring to FIG. 1D it will be noted that, until relay 2T–PB is thus picked up, the energizing stick circuit for relay 2T–PC is interrupted at back contact 70 of relay 2T–PA and it is thus assumed here that the drop away time of relay 2T–PC is sufficient to bridge that time interval between the picking up of relay 2T–PA and the subsequent picking up of relay 2T–PB, so that relay 2T–PC is now also maintained in its normal picked up position by the previously described energizing circuit which includes front contact 17 of relay 2T–PB.

With relays 2T–PA, 2T–PB now returned to their normal picked up positions, occupancy detecting relays 2T–TR is now also returned to its normal picked up position by the previously described energizing circuit, including contacts 18 of push button 2T–MRP and front contacts 19, 20 and 21 of relays 2T–PA, 2T–PB and 2T–PC respectively, and thereby opens its back contact 62 to remove the coding from wayside loop circuit 2TC.

Having thus described the typical operation of the circuit organization associated with track section 2T, for a westbound vehicle, a similar discussion will now be set forth for an assumed eastbound vehicle entering at the left-hand end of track section 2T of FIG. 1D. When the head end of this assumed eastbound vehicle passes wayside check-in coil 2T–RCI of FIG. 1C, relays 2T–RCIR of FIG. 1D is momentarily energized to open its back contact 10 and relay 2T–PA is now dropped away to initiate the check-in process. Relay 2T–PB, however, is maintained in its normal energized position by a stick circuit which now extends from (+), through front contact 78 of relay 2T–RCIR, front contact 61 of relay 2T–PB, and to (—).

In a similar manner to that set forth in describing the operation for a westbound vehicle, when relay 2T–PA is thus dropped away, occupancy detecting relay 2T–TR also closes its back contacts and thereby completes the energizing circuit for relay 2T–CP, extending from (+), through back contact 62 of relay 2T–TR, front contact 63 of relay 2T–PC, through front contacts 64 and 65 of relays 2T–YH and 2T–GH respectively (assuming clear advance conditions east of track section 2T), through front contact 66 of code transmitter 18OCT, and to (—). This 180 code rate energization of code repeater 2T–CP then causes the 180 code rate, distinctive of the assumed clear condition in advance of track section 2T, to be applied to loop circuit 1TC to control the eastbound vehicle.

Referring to FIG. 1D, it will be noted that back contact 11 of relay 1T–RCOR is connected in series in the normal stick circuit for relay 2T–PA. This insures that the eastbound vehicle will be checked into track section 2T (when the tail end of the vehicle passes way side coil 1T–RCO) in the event check-in coil relay 2T–RCIR fails to properly register the passing of the head end of the eastbound vehicle. Similarly, back contact 13 of relay 3T–LCOR is connected in the normal stick circuit of relay 2T–PA and serves a similar purpose during westbound moves.

In substantially the same manner as was previously set forth for the assumed westbound vehicle, after this assumed eastbound vehicle has been properly checked into track section 3T of FIG. 1E, and, the tail end of the vehicle passes wayside check-out coil 2T–RCO of FIG. 1E, check-out relay 2T–CO of FIG. 1D is momentarily energized by a circuit extending from (+) in FIG. 1E, through back contact 79 of relay 3T–PA (which was dropped away when the eastbound vehicle was checked into track section 3T), through front contact 80 of relay 2T–RCOR, along wire 81 between FIGS. 1E and 1D, through front contact 76 of relay 2T–PC, and to (—). In exactly the same way as that previously described for restoring the circuit organization of track section 2T to its normal condition, relays 2T–PA, 2T–PB and 2T–TR are again returned to their normal picked up positions, to properly check the assumed eastbound vehicle out of track section 2T, upon this picking up of check-out relay 2T–CO. Furthermore, the subsequent picking up of occupancy detecting relay 2T–TR once again removes the vehicle control coding from loop circuit 2TC.

GENERAL OPERATION

In order to point out how the system of the present invention provides for controlling both following and opposing vehicle moves, it will now be assumed, with the illustrated circuit organization returned to its illustrated normal condition, that the control office (not shown) wishes to condition the illustrated track layout for a westbound main line move for a railway vehicle approaching wayside signal 2LA of FIG. 1G. Initially then, the control office sends out a switch control transmission for positioning track switch SW2 of FIG. 1G to its normal position, and, after track switch SW2 has been operated to its full normal position, switch correspondence relay 2NWC of FIG. 1F is picked up as illustrated in the accompanying drawings.

YH is picked up and relay GH is dropped away, the energizing circuit for the code repeater relay CP will be connected so as to select a 75 code rate for the associated loop circuit TC. Finally, if both relays YH and GH are picked up, the energizing circuit for code repeater relay CP will be connected so as to select a 180 code rate for the associated wayside loop circuit TC. In addition, although no energizing circuits have been illustrated for the various code transmitters CT, shown in the accompanying drawings, it is assumed that these code transmitters CT are continuously energized to transmit their respective code rates.

Since track switch SW2 of FIG. 1G is unlocked, by the previously described pick up of relays 2L and 2LS, and therefore is not in condition for train movements thereover, relays B–YH and B–GH are both deenergized. More specifically, the eastbound energizing circuit for relay B–YH; i.e. the circuit by which relay B–YH is energized for eastbound traffic, is interrupted at back contacts 41 and 42 of relays 2L and 2LS respectively. With relay B–YH thus dropped away, the eastbound energizing circuit for relay B–GH is also interrupted at front contact 43 of relay B–YH. As previously mentioned, with relays B–YH and B–GH both dropped away, the energizing circuit for code repeater relay B–CP of FIG. 1F is normally set for 37½ code rate energization.

Relays 3T–YH and 3T–GH, associated with track section 3T of FIG. 1E, are also both dropped away, the eastbound energizing circuit for relay 3T–YH being opened at front contact 44 of signal clearing relay 2RGZ (see FIG. 1F), whereas the eastbound energizing circuit for relay 3T–GH is interrupted at front contact 45 of relay 3T–YH. Therefore, the energizing circuit for code repeater 3T–CP is also normally set for 37½ code rate energization.

Relay 2T–YH of FIG. 1D, however, is energized at this time by circuit extending from (+) in FIG. 1E, through front contact 46 of relay 3T–TR, along wire 47 between FIGS. 1E and 1D, through back contact 48 of relay 2T–TF, and to (—). However, relay 2T–GH is not energized at this time due to the interruption of its energizing circuit at front contact 49 of relay 3T–YH of FIG. 1E. With relay 2T–YH picked up and relay 2T–GH thus dropped away, the energizing circuit of code repeater relay 2T–CP of FIG. 1D is normally set for 75 code rate energization.

Relays 1T–YH and 1T–GH of FIG. 1E are both energized at this time; relay 1T–YH being energized by a circuit extending from (+) in FIG. 1D, through front contact 50 of relay 2T–TR, along wire 51 between FIGS. 1D and 1C, through back contact 52 of relay 1T–TF, and to (—), and, relay 1T–GH being energized by a circuit extending from (+) in FIG. 1D, through front contact 53 of relay 2T–YH, along wire 54 between FIGS. 1D and 1C, through front contact 55 of relay 1T–YH, back contact 56 of relay 1T–TF, and to (—). The energizing circuit for code repeater relay 1T–CP is therefore normally set at 180 code rate energization.

Although the track conditions eastbound or to the right of the OS section for track switch SW1 are clear; i.e. relays 1T–YH and 1T–GH are both picked up, relays A–YH and A–GH of FIG. 1B are not energized at this time since track switch SW1 is normally unlocked by the previously discussed picking up of relays 1L and 1LS of FIG. 1J. That is, the pick up circuit for relay A–YH is interrupted at back contacts 57 and 58 of relays 1L and 1LS respectively, whereas the energizing circuit for relay A–GH is interrupted at front contact 59 of relay A–YH. Therefore, the energizing circuit for code repeater relay A–CP is normally set for 37½ code rate energization. Similarly, since track switch SW1 is unlocked and signal clearing relay 1RGZ of FIG. 1B is deenergized, relays MA–YH and MA–GH of FIG. 1A and relays SA–YH and SA–GH of FIG. 1H are also deenergized and thereby normally set up the energizing circuits, for the code repeater relays CP (not shown) associated with track sections SA and MA of FIG. 1A, for 37½ code rate energization.

As previously pointed out, the code repeater relays CP, utilized in the selected embodiment, have their respective energizing circuits normally selected by the relays YH and GH, but, the actual energization of the relays CP occurs only while the associated track sections are occupied, as detected by occupancy detecting relays TR. Thus, the vehicle control codes are applied to the wayside loop circuits TC only when needed for controlling railway vehicles. Furthermore, as mentioned previously, although only two relays (YH and GH) are illustrated for selecting the vehicle control coding for each loop circuit, it is obvious that, if required, additional code selecting relays could also be provided, to obtain additional vehicle controls and/or indications.

TYPICAL TRACK SECTION OPERATION

Since each of the illustrated track sections has associated with it circuit apparatus similar to that of all other sections, the typical operation of the circuit apparatus for track section 2T of FIG. 1D will now be set forth in detail for both east and westbound vehicle moves, in order to facilitate in the present disclosure.

Neglecting, for the time being, the operation of directional magnetic stick relays TF, it will be assumed that the various other relays (PA, PB, etc.), associated with section 2T, are in their respective normal operation positions shown in the accompanying drawings. When the head end of a westbound vehicle now passes wayside check-in coil 2T–LCI of FIG. 1E, and vehicle carried coil VH of FIG. 2 thereby causes momentary picking up of the associated relay 2T–LCIR of FIG. 1D, relay 2T–PA is dropped away by the opening of back contact 12 of relay 2T–LCIR. Although the above described normal energizing circuit for relay 2T–PB is also interrupted by the subsequent opening of front contact 16 of relay 2T–PA, relay 2T–PB is now maintained in its normal picked up position by a temporary stick circuit which extends from (+), through back contact 59a of relay 2T–RCIR, front contact 60 to relay 2T–LCIR, front contact 61 of relay 2T–PB, and to (—). However, this dropping away of relay 2T–PA does interrupt the energizing circuit for occupancy detecting relay 2T–TR, at front contact 19 of relay 2T–PA, to properly check the westbound vehicle into track section 2T.

Dependent upon the existing positions of relays 2T–YH and 2T–GH, which are positioned in accordance with the advance conditions to the left or westbound from track section 2T, relay 2T–CP is now energized to apply one of the above mentioned code rates to the wayside loop circuit 2TC. For example, if it is assumed that conditions are clear westbound from track section 2T; i.e. relays 2T–YH and 2T–GH are both picked up, relay 2T–CP is energized at a 180 code rate by a circuit extending from (+), through back contact 62 of relay 2T–TR, front contact 63 of relay 2T–PC which was not dropped away when the westbound vehicle entered track section 2T, front contacts 64 and 65 of relays 2T–YH and 2T–GH respectively, front contact 66 of code transmitter 180CT, and to (—). This coded energization of code repeater 2T–CP causes a 180 code rate to be applied to loop circuit 2TC by a circuit extending from (BX), through front contact 67 of relay 2T–CP, through wayside loop circuit 2TC, and to (NX). As mentioned previously, the reception of this 180 code rate, on the vehicle, via receiver coils RC of FIG. 2, causes the westbound vehicle occupying track section 2T to either speed up to or continue at its nominal high speed setting in accordance with the assumed clear conditions westbound from track section 2T.

As mentioned previously, relay 2T–LCIR is but momentarily energized as the head end of the assumed westbound vehicle passes wayside coil 2T–LCI, and, when In order to establish this desired westbound traffic direction, the control office now sends out a signal clearing control to pick up relay 2LGZ of FIG. 1K. Even though back contact 32 of relay 2LGZ is now opened, approach relay 2LAS is maintained picked up, until the proper direction of traffic is established, by an additional stick circuit including back contact 82 of directional magnetic stick relay B–TF.

This picking up of signal clearing relay 2LGZ, however, also completes an energizing circuit for traffic relay 2LF of FIG. 1K extending from (+), through front contact 85 of relay 2LGZ, and to (−). The subsequent picking up of traffic relay 2LF then causes directional magnetic stick relays B–TF, 3T–TF, 2T–TF, 1T–TF and A–TF of FIGS. 1K, 1E, 1D, 1C and 1J respectively to each assume their picked up or westbound position by energizing them with that polarity of current required for pick up of these directional magnetic stick relays. More specifically, these directional magnetic stick type relays TF are energized by current (conventional current assumed) flowing from left to right in their respective windings, over a circuit extending between (+) and (−) in FIG. 1K, through front contacts 86 of relay 2LF, along wires 87 between FIGS. 1K, 1F and 1E, through front contacts 88 of relay 3T–TR, along wire 89 between FIGS. 1E and 1D, through front contacts 90 of relay 2T–TR, along wires 91 between FIGS. 1D and 1C, through front contacts 92 of relay 1T–TR, along wires 93 between FIGS. 1C, 1B and 1J, through back contact 94 of relay 1RF and through front contacts 95 and 96 of relays 1RAS and A–TR respectively. As mentioned previously, with these magnetic stick type relays TF now energized by the above described energizing circuit, a westbound traffic direction has been established on the illustrated track layout and approach relay 2LAS is then dropped away.

Since it has been assumed here that a westbound railway vehicle is approaching wayside signal 2LA of FIG. 1G, it should be evident, from the above, that the directional magnetic stick type relays TF, associated with the main track portion of siding B, have also been previously positioned, for this assumed westbound move; i.e. these directional magnetic stick type relays have been energized to assume their picked up positions. Referring to FIG. 1G, relay MB–TF is among these directional magnetic stick relays associated with the main track portion of siding B and is thus assumed to now occupy its picked up or westbound traffic position, and, as previously mentioned, relay MB–TF remains in this picked up position even though the energizing current to its winding may have been subsequently interrupted, for example, by the dropping away of an occupancy detecting relay TR associated with the main track portion of siding B.

With approach relay 2LAS dropped away, switch relays 2L and 2LS of FIG. 1K are now both dropped away to lock up track switch SW2; i.e. to prevent any further operation of track switch SW2. More specifically, the dropping away of relay 2LAS opens its front contact 37 and interrupts the previously described energizing circuit for relay 2L which in turn opens its own front contact 40 located in the normal energizing circuit for relay 2LS. It will be noted in FIG. 1K that relay 2LS is also provided with a stick circuit including front contact 39 of relay B–TR and back contacts 96a and 96b of relays 2RWC and 2NWC respectively. This stick circuit, completed while the track switch SW2 is moving to the designated position called for by the control office, is provided to keep power on track switch SW2 (via circuits not shown) to insure complete positioning of the track even though relay 2L may open its front contact 40 in response to the dropping away of relay 2LAS, when signal clearing relay 2LGZ is picked up.

Time element relay 2TE is provided in FIG. 1K to prevent any abrupt changing of the position of track switch SW2 in front of an approaching vehicle that may be traveling at too fast a speed to be safely brought to a complete stop short of wayside signal 2LA. Thus, if relays 2LAS, 2L and 2LS have been deenergized, by the picking up of signal clearing relays 2LGZ, and, if the control office operator then returns signal clearing relay 2LGZ to its normal deenergized position, relay 2LAS cannot be immediately picked up to unlock track switch SW2, until the timing operation of time element relay 2TE has been completed. More specifically, if signal clearing relay 2LGZ is dropped away by the control office, with relay 2LAS also dropped away, relay 2TE is then energized by a circuit extending from (+), through back contact 32 of relay 2LGZ, front contact 97 of relay B–TR, back contact 98 of relay 2LAS, and to (−). However, as soon as time element relay 2TE completes its preselected timing operation and closes its front contact 99, relay 2LAS can be picked up, to unlock track switch SW2, by a circuit extending from (+), through back contact 32 of relay 2LGZ, front contact 97 of relay B–TR, front contact 99 of relay 2TE, and to (−). Check contact 38a of time element relay 2TE insures that the timer returns to normal after each operation.

Assuming now that the directional magnetic stick relays B–TF, 3T–TF, 2T–TF, 1T–TF and A–TF have been properly actuated to their picked up or westbound positions, the relays YH and GH, shown in the accompanying drawings are now selectively energized to register the advance conditions existing westbound on the illustrated track layout.

More specifically, since relay 1L and 1LS of FIG. 1J are both picked up and therefore track switch SW1 of FIG. 1A is still unlocked, the westbound energizing circuit for relay A–YH of FIG. 1B is interrupted at back contacts 100 and 101 of relays 1L and 1LS respectively. Furthermore, the energizing circuit for relay A–GH is therefore also opened at front contact 102 of relay A–YH.

Relays 1T–YH and 1T–GH, of FIG. 1C are now also dropped away, under present conditions. More specifically, the westbound energizing circuit for relay 1T-YH is interrupted at front contact 103 of signal clearing relay 1LGZ (see FIG. 1B), whereas the westbound energizing circuit for relay 1T–GH is also opened at front contact 104 of relay 1T–YH.

Since it has been assumed that no railway vehicles are occupying the illustrated stretch of single track, occupancy detecting relay 1T–TR is therefore picked up and completes the westbound energizing circuit for relay 2T–YH of FIG. 1D extending from (+) in FIG. 1C, through front contact 105 of relay 1T–TR, along wire 106 between FIGS. 1C and 1D, through the front or westbound contact 107 of relay 2T–TF, and to (−). However, since relay 1T–YH of FIG. 1C is not as yet picked up, the westbound energizing circuit for relay 2T–GH of FIG. 1D is interrupted at front contact 108 of relay 1T–YH (see FIG. 1C).

With relay 2T–YH now energized, as described above, and, since occupancy detecting relay 2T–TR is also energized under the assumed operating conditions, relays 3T–YH and 3T–GH are now both picked up over their respective westbound energizing circuits extending between FIGS. 1D and 1E.

Since track switch SW2 has been locked in its normal position, by the dropping away of relays 2L and 2LS of FIG. 1K, relay B–YH of FIG. 1F is now energized by a circuit extending from (+) in FIG. 1E, through front contact 109 of relay 3T–TR, along wire 110 between FIGS. 1E and 1F, through back contacts 111 and 112 of relays 2LS and 2L respectively, front or westbound contact 113 of directional magnetic stick relay B–TF, and to (−). In addition, relay B–GH is also energized by a circuit extending from (+) in FIG. 1E, through front contact 114 of relay 3T–YH, along wire 115 between FIGS. 1E and 1F, through front contact 116 of relay B–YH, front or westbound contact 117 of relay B–TF, and to (−).

Provided that signal clearing relay 2LGZ of FIG. 1K is picked up and that track switch SW2 has been properly locked in its normal position, relay MB–YH of FIG. 1G is now energized over its westbound energizing circuit extending from (+) in FIG. 1E through front contact 109 of relay 3T–TR, along wire 110 between FIGS. 1E and 1F, through back contacts 111 and 112 of relays 2LS and 2L respectively, through front or westbound contact 118 of relay B–TF, front contacts 119, 120, 121 and 122 of relays B–TR, 2LGZ, 2RAS and 2NWC respectively, along wire 123 between FIGS. 1F and 1G, through front or westbound contact 124 of relay MB–TF, and to (−). Consequently, relay MB–GH is also energized, at this time, over its westbound energizing circuit extending from (+) in FIG. 1F, through front contact 125 of relay B–YH, along wire 126 between FIGS. 1F and 1G, through front contacts 127 and 128 of relays MB–YH and MB–TF respectively, and to (−). Although the coding apparatus associated with main track section MB has not been shown in the accompanying drawings, it is substantially the same as that associated with track sections 1T, 2T and 3T, and therefore, this above described picking up of relays MB–YH and MB–GH causes a 180 code rate to be applied to that loop circuit (not shown) associated with track section MB, when the assumed westbound vehicle is properly checked into track section MB, by the dropping away of occupancy detecting relay MB–TR. This occurs in exactly the same manner as was previously described for coding loop circuit 2TC of FIG. 1D when a westbound railway vehicle checked into track section 2T.

From the above discussion, it is apparent that a permissive or proceed coding is applied to that loop circuit (not shown), associated with track section MB, only after signal clearing relay 2LGZ is properly picked up by control office transmission. It should therefore be obvious that, irrespective of whether or not wayside signals are employed during application of the system of the present invention, proper entrance control for both manned and unmanned vehicles is provided, to properly control the entering of such vehicles onto the single track portion of the illustrated track layout.

Referring to FIG. 1G, the relays MB–LCIR and MY–LCOR are associated with wayside check-in and check-out coils located near the right-hand end (not shown) of track section MB. More specifically, relay MB–LCIR is the westbound check-in coil relay for track section MB and relay MY–LCOR is assumed to be the westbound check-out coil relay for the first track section east of section MB. Similarly, relay SY–LCOR of FIG. 1L is the westbound check-out coil relay for the first track section (not shown) to the right or east of siding track section SB of FIG. 1G.

Assuming now that the head end of the westbound vehicle passes that wayside check-in coil associated with relay MB–LCIR of FIG. 1G; i.e. vehicle carried transmitting coil VH of FIG. 2 causes momentary energization of relay MB–LCIR, relay MB–PA of FIG. 1G is dropped away by the interruption of its existing stick circuit at back contact 129 of relay MB–LCIR. In a manner exactly the same as that previously discussed, when considering the typical operation of the circuit apparatus associated with track section 2T of FIG. 1D, the westbound railway vehicle is properly checked into track section MB. Occupancy detecting relay MB–TR of FIG. 1G is then dropped away to cause the 180 code rate selected by relay MB–YH and MB–GH, to be applied to the loop circuit (not shown) associated with track section MB, thus permitting the westbound vehicle to enter at the right-hand end of the OS section associated with track switch SW2. Recalling now the typical operation previously set forth for track section 2T, after the vehicle has been properly checked into track section MB, relays MB–PA, MB–PB and MB–TR will be deenergized and relay MB–PC will be maintained picked up.

Furthermore, in response to the 180 code rate now being applied for track section MB, the westbound vehicle may now operate at its nominal high speed setting, in accordance with the assumed code designations previously set forth.

When the head end of this westbound vehicle passes check-in coil B–MLCI of FIG. 1G, relay B–MLCIR is momentarily energized to drop relay B–PA of FIG. 1F by the opening of back contact 25 of relay B–MLCIR, in the existing stick circuit for relay B–PA. Relay B–PB, however, is maintained picked up by a temporary stick circuit extending from (+) in FIG. 1L, through back contact 130 of relay B–SLCIR, along wire 131 between FIGS. 1L and 1G, front contact 132 of relay B–MLCIR, along wire 133 between FIGS. 1G and 1F, through front contact 134 of relay B–PB, and to (−). This retainment of relay B–PB in its normal picked up position furthermore maintains relay B–PC in its normal picked up position over a circuit including front contact 135 of relay B–PB.

Occupancy detecting relay B–TR is now dropped away, due to the opening of front contact 136 of relay B–PA, and thereby completes the energizing circuit for code repeater relay B–CP of FIG. 1F, extending from (+), through back contact 137 of relay B–TR, front contact 138 of relay B–PC, front contacts 139 and 140 of relays B–YH and B–GH respectively, front contact 141 of code transmitter 18OCT, and to (−). Thus, 180 code rate is now directly applied to loop circuit 1BTC via front contact 142 of code repeater relay B–CP, and, also to loop circuit 2BTC of FIG. 1G through back contact 143 of switch correspondence relay 2RWC, front contact 144 of switch correspondence relay 2NWC and along wire 145 between FIGS. 1F and 1G. This 180 code rate applied to loop circuits 1BTC and 2BTC is then received by vehicle carried receiving coils RC of FIG. 2 and controls the westbound vehicle, over the OS section for track switch SW2, at its high speed setting. As soon as relay B–MLCIR returns to its normal deenergized position (the head end of the vehicle has passed wayside check-in coil B–MLCI), relay B–PB is now dropped away by the opening of its temporary stick circuit at front contact 132 of relay B–MLCIR (see FIG. 1G).

Referring to FIG. 1F, it will be noted that the above described dropping away of relay B–PB does not cause relay B–PC to drop away, since a stick circuit for relay B–PC is then established extending from (+) in FIG. 1L, through back contact 130 of relay B–SLCIR, along wire 131 between FIGS. 1L and 1G through back contact 146 of relay B–MLCIR, along wire 147 between FIGS. 1G and 1F, through back contact 148 of relay B–RCIR, back contact 149 of relay B–PA, front contact 150 of relay B–PC, and to (−). As previously pointed out, this retainment of relay B–PC in its normal picked up position is necessary to complete the energizing circuit for code repeater relay B–CP; i.e. front contact 138 of relay B–PC is inserted, in series, in the energizing circuit for this code repeater B–CP.

It will be noted in FIG. 1F, that front contact 119 of relay B–TR is included in the westbound energizing circuit for relay MB–YH of FIG. 1G, and therefore, as soon as the westbound vehicle has been properly checked into the OS section associated with track switch SW2, relays MB–YH and MB–GH will now both be dropped away to terminate the 180 coding for track section MB and cause instead a 37½ code rate to be applied to the loop circuit (not shown) for section MB.

Referring to FIG. 1G, when the tail end of the westbound vehicle passes wayside check-out coil MB–LCO, relay MB–LCOR is momentarily energized to pick up of check-out relay MB–CO by a circuit extending from (+) in FIG. 1F, through back contact 151 of relay B–PA, along wire 152 between FIGS. 1F and 1G, through front contact 153 of relay MB–LCOR, front contact 154 of relay MB–PC, and to (−). This picking up of check-out relay MB–CO now completes the energizing circuit for relay MB–PA extending from (+), through back contacts 154a and 154b of relays MB–RCIR and B–MRCOR respectively, back contacts 129 and 155 of relays MB–LCIR and MY–LCOR respectively, front contact 157 of relay MB–CO, and to (−). Relay MB–PB is now also returned to its normal energized position by the completion of its normal energizing circuit through front contact 158 of relay MB–PA, and, this in turn establishes the normal pick up circuit for relay MB–PC including front contact 159 of relay MB–PB. Furthermore, occupancy detecting relay MB–TR is now also returned to its normal picked up position over its normal energizing circuit extending from (+), through contacts 160 of push button MB–MRP, front contacts 161, 162 and 163 of relays MB–PA, MB–PB and MB–PC respectively, and to (−).

With this westbound vehicle traveling at high speed, check-in coil 3T–LCI of FIG. 1F is then momentarily actuated by vehicle carried transmitting coil VH of FIG. 2, and the associated check-in coil relay 3T–LCIR of FIG. 1E is momentarily energized to open its back contact 164 and thereby interrupt the existing stick circuit for relay 3T–PA. Thus, this momentary energization of relay 3T–LCIR initiates the checking in of the westbound vehicle at track section 3T, in exactly the same manner as was previously described for checking a westbound vehicle into track section 2T of FIG. 1D. Furthermore, after the westbound vehicle has been properly checked into track section 3T, occupancy detecting relay 3T–TR is dropped away and completes the energizing circuit for code repeater relay 3T–CP, for applying a 180 code rate to loop circuit 3TC. More specifically, the 180 code rate energizing circuit for relay 3T–CP is completed through back contact 165 of relay 3T–TR, front contact 166 of relay 3T–PC, front contacts 167 and 168 of relay 3T–YH and 3T–GH respectively, front contact 169 of code transmitter 180CT, and to (−). The 180 vehicle control code rate thus applied to loop circuit 3TC, through front contact 170 of code repeater 3T–CP, then permits the vehicle to continue at high speed.

Recalling now the assumed conditions existing on the illustrated track layout, i.e. relay 2T–YH is picked up and relay 2T–GH is dropped away, when the westbound vehicle checks into track section 2T, a 75 code vehicle control code is then applied to loop circuit 2TC, through front contact 67 of code repeater 2T–CP, due to the 75 code rate energization of code repeater 2T–CP by a circuit extending from (+), through back contact 62 of occupancy detecting relay 2T–TR, front contact 63 of relay 2T–PC, front contact 64 of relay 2T–YH, back contact 171 of relay 2T–GH, front contact 172 of code transmitter 75CT, and to (−). As previously mentioned, this 75 vehicle control code being applied to loop circuit 2TC causes the westbound vehicle to decrease its speed to its normal low speed setting.

In addition, as soon as the westbound vehicle checks into track section 1T of FIG. 1C, code repeater 1T–CP is energized at a 37½ code rate by a circuit extending from (+), through back contact 173 of occupancy detecting relay 1T–TR, front contact 174 of relay 1T–PC, back contact 175 of relay 1T–YH, front contact 176 of code transmitter 37½CT, and to (−). This 37½ vehicle control code, applied to loop circuit 1TC via front contact 177 of code repeater relay 1T–CP, then causes a service brake application to be initiated on the westbound vehicle.

Assuming now that this westbound vehicle has properly stopped on track section 1T of FIG. 1C, in response to the 37½ code rate now being applied to wayside loop circuit 1TC, the operation of the selected embodiment of the present invention will now be discussed for a following westbound vehicle.

Referring now to the accompanying drawings, it will be noted that, with this first westbound vehicle occupying track section 1T only, the respective westbound energizing circuits for relays YH and GH, associated with track sections 2T and 3T, are now conditioned for selecting a 37½ vehicle control for wayside loop circuit TC and a 75 vehicle control for wayside loop circuit 3TC; i.e. relays 2T–YH and 2T–GH are both dropped away, whereas, relay 3T–GH is dropped away and relay 3T–YH is picked up. Furthermore, assuming that signal clearing relay 2LGZ of FIG. 1K has been picked up, for the following westbound vehicle, and that track switch SW2 is properly locked in its normal position, relays B–YH, B–GH, MB–GH are now all picked up, over their respective westbound energizing circuits, for selecting 180 vehicle control codes for the OS section of track switch SW2 and main track section MB. As previously pointed out, these vehicle control codes are only applied to the wayside loop circuits TC, when the associated track sections become occupied. Therefore, when the following westbound vehicle successfully enters the OS section of FIG. 1F and 1G, it may continue at its nominal high speed setting. However, as soon as this following westbound vehicle checks into track section 3T of FIG. 1E, its speed will be described, in response to the 75 code rate then being applied to loop circuit 3TC. Furthermore, when this following westbound vehicle checks in with track section 2T of FIG. 1D, a 37½ code rate is applied to loop circuit 2TC which initiates the service brake applications on the following westbound vehicle.

If for some reason this following westbound vehicle fails to properly stop, short of track section 1T, and the head end of the vehicle passes wayside check-in coil 1T–LCI of FIG. 1D, relay 1T–LCIR of FIG. 1C is momentarily picked up and thereby interrupts the existing stick circuit for relay 1T–PC extending from (+) in FIG. 1C, through back contact 177a of relay 1T–RCIR, back contact 178 of relay 1T–LCIR, back contact 180 of relay 1T–PA, front contact 181 of relay 1T–PC, and to (−). This dropping away of relay 1T–PC causes its front contact 174 to open, thereby interrupting the energizing circuit for code repeater relay 1T–CP and therefore removing all vehicle control coding from loop circuit 1TC. As mentioned previously, this "no code" condition causes this following westbound vehicle to receive an emergency brake application control.

In order to now illustrate how the system of a selected embodiment operates for controlling the meet of opposing railway vehicles, it will now be assumed that, with a westbound vehicle occupying track section 1T, an eastbound railway vehicle is approaching wayside signal 1RA of FIG. 1A and that the control office wishes to have the westbound vehicle take the siding track at siding A, so as to permit the eastbound vehicle to travel over the illustrated stretch of single track. Initially the control office then sends out a switch control for operating track switch SW1 of FIG. 1A to its reverse position, and, after track switch SW1 has completed its move to this reverse position, switch correspondence relay 1RWC of FIG. 1B is picked up.

The control office now sends out a control for picking up signal clearing relay 1LGZ of FIG. 1J to clear wayside signal 1L of FIG. 1C to the left for permitting the westbound vehicle to enter the siding track portion of siding A. Thus, when relay 1LGZ is picked up, traffic relay 1SLF of FIG. 1H is energized by a circuit extending from (+) in FIG. 1B, through front contacts 182 and 183 of relays 1LGZ and 1RWC respectively, along wire 184 between FIGS. 1B, 1J and 1H, and to (−). With relay 1SLF now picked up, the directional magnetic stick relays TF, associated with the siding track portion of siding A, are now energized with that polarity of current necessary to cause pick up of the relays; i.e., to cause them to assume their westbound position. For example, relay SA–TF of FIG. 1H is now energized with that polarity of current for causing it to close its front contacts by a circuit (partially shown in FIG. 1H) extending between (+) and (−) in FIG. 1H, through front contact 185 of relay 1SLF, front contacts 186 of relay SA–TR, and along wires 187 extending to the left or westbound in FIG. 1H.

As mentioned previously, it is desirable to retain approach relay 1LAS in its normal picked up position, even though signal clearing relay 1LGZ is picked up by the control office and subsequently opens its back contact 187a, until the system checks that the desired route is available and that the proper direction of traffic has been established. These later mentioned functions are performed by additional stick circuits for approach relay 1LAS including back contact 188 of relay MA–TF (see FIG. 1A), back contact 188a of relay SA–TF (see FIG. 1H), and back contacts 189 and 189a of switch correspondence relays 1NWC and 1RWC respectively (see FIG. 1J).

Since relays SA–TF and 1RWC have both been picked up as previously described, to open their respective back contacts 188a and 189a, all stick circuits for approach relay 1LAS of FIG. 1J are now interrupted and therefore relay 1LAS is dropped away. The subsequent opening of front contact 190 of relay 1LAS now drops relay 1L and furthermore results in the dropping away of relay 1LS, caused by the opening of front contact 190a of relay 1L. The track switch SW1 is now locked in its reversed position.

Assuming now that the the siding track portion of siding A is unoccupied, relays SA–YH and SA–GH of FIG. 1H will both be picked up over their respective westbound energizing circuits. In addition, with track switch SW1 locked in its reverse position and signal clearing relay 1LGZ picked up, relay A–YH of FIG. 1B is now energized by its westbound energizing circuit extending from (+) in FIG. 1H, through front contacts 191 and 192 of relays SA–TR and SA–TF respectively, along wire 193 between FIGS. 1H, 1J and 1B, through front contact 194 of switch correspondence relay 1RWC, back contacts 101 and 100 of relay 1LS and 1L respectively, front or westbound contact 195 of relay A–TF, and to (−). Furthermore, relay A–GH of FIG. 1B is also energized at this time over its westbound energizing circuit extending from (+) in FIG. 1H, through front contact 196 of relay SA–YH, along wire 197 between FIGS. 1H, 1A and 1B, front contact 198 of switch correspondence relay 1RWC, front contact 102 of relay A–YH, front or westbound contact 199 of relay A–TF, and to (−). In addition, relays 1T–YH and 1T–GH of FIG. 1C are now also energized at this time over their respective westbound energizing circuits. More specifically, relay 1T–YH is now energized (beginning at back contact 100 of relay 1L in FIG. 1B) through front or westbound contact 200 of relay A–TF, front contacts 201 and 202 of relays A–TR and 1RAS respectively, front contact 103 of relay 1LGZ, along wire 203 between FIGS. 1B and 1C, through front or westbound contact 204 of relay 1T–TF, and to (−). Also, relay 1T–GH of FIG. 1C is energized by a circuit extending from (+) in FIG. 1B, through front contact 205 of relay A–YH, along wire 206 between FIGS. 1B and 1C, front contact 104 of relay 1T–YH, front or westbound contact 207 of relay 1T–TF, and to (−).

Since the westbound vehicle is occupying track section 1T, occupancy detecting relay 1T–TR is therefore dropped away, and, the 180 code rate energizing circuit for code repeater relay 1T–CP is thus completed, extending through back contact 173 of relay 1T–TR, front contact 174 of relay 1T–PC, front contacts 208 and 209 of relays 1T–YH and 1T–GH respectively, and through front contact 210 of code transmitter 18OCT. Thus, a 180 vehicle control code is now applied to loop circuit 1TC and permits the westbound vehicle to get underway; i.e. the westbound vehicle is permitted to exit from the illustrated stretch of single track.

As this westbound vehicle moves along track section 1T, its head end transmitter coil VT of FIG. 2 soon passes wayside check-in coil A–LCI and thereby causes a momentary picking up of relay A–LCIR of FIG. 1B. Relay A–PA is now dropped away, by the momentary opening of back contact 211 of relay A–LCIR. This dropping away of relay A–PA causes relay A–PB and occupancy detecting relay A–TR to also drop away, as was previously discussed, for checking the vehicle into the OS section for track switch SW1. Furthermore, the closing of back contact 212 of occupancy detecting relay A–TR now completes the 180 code rate energizing circuit for code repeater relay A–CP, extending from (+) in FIG. 1B, through back contact 212 of relay A–TR, front contact 213 of relay A–PC, front contacts 214 and 215 of relays A–YH and A–GH respectively, front contact 216 of code transmitter 18OCT, and to (−). This 180 code rate energization of code repeater A–CP causes its front contact 217 to be closed at a 180 code rate for applying high speed vehicle control code directly to loop circuit 1ATC and also to loop circuit 3ATC of FIG. 1A by a circuit extending from (BX) in FIG. 1B, through front contact 217 of relay A–CP, back contact 218 of relay 1NWC, front contact 219 of relay 1RWC, along wire 220 between FIGS. 1B and 1A, and to (NX). The westbound vehicle may now continue, at its nominal high speed setting, into the unoccupied siding track portion of siding A, to permit the eastbound vehicle, assumed to be approaching signal 1RA, to utilize the illustrated stretch of single track.

It should be understood at this time that it may be desirable, in practice, to reduce the speed of a railway vehicle over a reversed track switch. Therefore, if desired, low speed vehicle control code could be applied to wayside loop circuits 1ATC and 3ATC, in order to restrict the speed of the railway vehicles travelling over track switch SW1 in its reverse position, without departing from the scope of the present invention. Similarly, low speed vehicle control coding could also be applied to any wayside loop circuits associated with track sections disposed on curves, hills, etc.

Assuming that this westbound vehicle has properly checked into siding track section SA of FIG. 1A (initiated when the head end of the vehicle passes wayside coil SA–LCI), when the tail end of the vehicle passes wayside check-out coil A–SLCO of FIG. 1A, the associated relay A–SLCOR of FIG. 1H is momentarily energized. Check-out relay A–CO of FIG. 1B is now momentarily picked up, to check the westbound vehicle out of the OS section for track switch SW1, by a circuit extending from (+) in FIG. 1H, through back contact 221 of relay SA–PA, front contact 222 of relay A–SLCOR, along wire 223 between FIGS. 1H, 1A and 1B, through front contact 224 of relay A–PC, and to (−). This picking up of check-out relay A–CO now returns the circuit organization, associated with the OS track section, to its normal operating conditions wherein occupancy detecting relay A–TR is picked up to open its back contact 212 and remove the vehicle control coding from loop circuits 1ATC and 3ATC of FIGS. 1B and 1A.

However, between the time when check-out relay A–CO first picks up to check the eastbound vehicle out of the OS section, and the later time when occupancy detecting relay A–TR picks up, an energizing circuit is momentarily established for relay 1LAS of FIG. 1J. More specifically, relay 1LAS is picked up by a circuit extending from (+), through back contact 187a of signal clearing relay 1LGZ, back contact 225 of relay A–TR, front contact 226 of check-out relay A–CO, and to (−). This temporary pick up circuit is provided to enable track switch SW1 to be unlocked as soon as the westbound vehicle departs from the OS track section, and therefore, avoids the time delay that would otherwise be introduced by time element relay 1TE of FIG. 1J.

Assuming now that relay 1LAS has been properly picked up by the above described temporary energizing circuit, relay 1L of FIG. 1J is now picked up by a circuit extending from (+), through front contact 190 of relay 1LAS, front contacts 227 and 228 of relays 1RAS and A–TR respectively, check contact 228a of time element relay 1TE, and to (−). This pick up of relay 1L, in turn, causes pick up of relay 1LS by a circuit extending from (+), through front contact 229 of relay A–TR, front contact 190a of relay 1L, and to (−). It will be noted in FIG. 1J that relay 1LS is also provided with a stick circuit to insure that power is maintained on track switch SW1 until complete operation of the switch, to its designated position, has occurred. This stick circuit was described in detail when considering the operation of track switch SW2 of FIG. 1G.

Referring now to FIG. 1B, it will furthermore be noted that a fornt contact 230 of relay 1RWC is included in the eastbound energizing circuit for the directional magnetic stick relays TF associated with the main track portion of siding A. This front contact 230 then permits the establishment of eastbound traffic on the main track portion of siding A, in the event that a westbound vehicle is being routed onto the siding track portion of siding A. Obviously, under such traffic conditions, any eastbound vehicles on the main track portion of the siding A would be required to stop to the left or west of wayside signal 1RA (see FIG. 1A).

Since the assumed eastbound vehicle is to utilize the illustrated stretch of single track, control office now sends out a switch control for operating track switch SW1 to its normal position, and, upon the completion of this switch operation, switch corresponding relay 1NWC of FIG. 1B will be picked up. As soon as signal clearing relay 1RGZ of FIG. 1J is subsequently picked up by the control office, traffic relay 1RF of FIG. 1J is energized by a circuit extending from (+), through front contact 232 of relay 1RGZ, and to (−). Therefore, the directional magnetic stick relays TF, associated with the illustrated stretch of single track will now be energized with that polarity of current necessary to cause them to be actuated to their dropped away or eastbound position by a circuit extending from (+) and (−) in FIG. 1J, through front contacts 233 of relay 1RF, along wires 93 between FIGS. 1J, 1B and 1C, front contacts 92 of relay 1T–TR, along wires 91 between FIGS. 1C and 1D, front contacts 90 of relay 2T–TR, along wires 89 between FIGS. 1D and 1E, through front contacts 88 of relay 3T–TR, along wires 87 between FIGS. 1E, 1F and 1K, through back contacts 234 of relay 2LF, and through front contact 235 and 236 of relays B–TR and 2LAS respectively. Thus, assuming conventional current flow, these directional magnetic stick relays TF are now energized by a current flowing from right to left in their respective windings so that these relays assume their dropped away or eastbound position (as shown) and each closes its associated back or eastbound contacts.

With directional magnetic stick relay A–TF in its eastbound position, wherein its front contact 236a is opened, and with signal clearing relay 1RGZ picked up, to open its back contact 236b, relay 1RAS is then dropped away and track switch SW1 is now locked in its normal position by the successive dropping away of relays 1L and 1LS of FIG. 1J. Furthermore, the relays YH and GH, associated with the illustrated stretch of single track now assume operating positons in accordance with the advance conditions existing to the right or eastbound in the accompanying drawings.

Assuming that track switch SW1 has been properly locked in its normal position, and, that signal clearing relay 1RGZ is still energized, relay MA–YH of FIG. 1A is now energized by a circuit extending from (+) in FIG. 1C, through front contact 237 of relay 1T–TR, along wire 238 between FIGS. 1C and 1B, through back contacts 58 and 57 of relays 1LS and 1L respectively, back or eastbound contact 239 of relay A–TF, front contacts 240, 241, 242 and 243 of relays A–TR, 1RGZ, 1LAS and 1NWC respectively, along wire 244 between FIGS. 1B and 1A, through back or eastbound contact 245 of relay MA–TF, and to (−). Also, relay MA–GH is energized at this time, by a circuit extending from (+) in FIG. 1B, through front contact 246 of relay A–YH, along wire 247 between FIGS. 1B and 1A, through front contact 248 of relay MA–YH, back or eastbound contact 249 of relay MA–TF, and to (−). A 180 code rate is now applied to the loop circuit (not shown) associated with track section MA in order that the eastbound vehicle, assumed to be approaching wayside signal 1RA, may enter onto the illustrated stretch of single track. It should of course be understood that this 180 code rate, for track section MA, is applied when the eastbound vehicle is checked into track section MA so as to drop occupancy detecting relay MA–TR of FIG. 1A. This check-in process is exactly the same as that previously described for the checking in, of an eastbound vehicle, at track section 2T of FIG. 1D.

Assuming that wayside signal 2R of FIG. 1E has not been cleared by the control office, this eastbound vehicle travel at high speed over the OS section of FIGS. 1A and 1B and also over track section 1T of FIG. 1C, has its speed reduced when it enters track section 2T of FIG. 2D, and, is finally brought to a complete stop when it enters track section 3T of FIG. 1E, due to the service brake application called for by the 37½ code rate then applied to wayside loop circuit 3TC. However, when wayside signal 2R is cleared by the control office (signal clearing relay 2RGZ of FIG. 1K is picked up), the eastbound vehicle will receive a proceed vehicle control code to permit the vehicle to exit from the single track.

As was pointed out previously, when discussing the typical operation of the circuit apparatus associated with track section 2T of FIG. 1D, the eastbound vehicle is checked into each of the illustrated track sections by the deenergization of the associated PA relay. For example, when the head end of the eastbound vehicle passes wayside check-in coil 2T–RCI of FIG. 1C, assoicated relay 2T–RCIR of FIG. 1D is momentarily picked up to open its back contact 10 and thereby interrupts the existing stick circuit for relay 2T–PA and thereby also begins the eastbound check-in process at track section 2T, after which occupancy detecting relay 2T–TR is dropped away to initiate the vehicle control coding of the associated wayside loop circuit 2TC. Furthermore, this eastbound vehicle is checked out of the illustrated track sections in substantially the same manner as was previously set forth when describing the typical operation of the apparatus associated with track section 2T of FIG. 1D. Thus, when the tail end of the eastbound vehicle passes wayside check-out coil 2T–RCO of FIG. 1E, check-out relay 2T–CO of FIG. 1D is momentarily energized by a circuit extending from (+) in FIG. 1E, through back contact 79 of relay 3T–PA, front contact 80 of relay 2T–RCOR, along wire 81 between FIGS. 1E and 1D, through front contact 76 of relay 2T–PC, and to (−).

As soon as this assumed eastbound vehicle departs at the right-hand end (not shown) of either track section MB or SB, the circuit organization returns to the assumed normal conditions illustrated in accompanying drawings.

It will now be assumed that the control office wishes to permit a westbound vehicle to enter the illustrated stretch of single track from the siding track portion of siding B of FIG. 1G. Thus, the control office sends out a switch control for causing track switch SW2 to assume its reverse position. At the end of this switch operation, switch correpsondence relay 2RWC of FIG. 1F will then be picked up. When the control office subsequently sends out a signal clearing control to pick up relay 2LGZ of FIG. 1K, traffic relay 2LF is then picked up and thereby causes the directional magnetic stick relays TF, associated with the illustrated stretch of single track, to be energized with that polarity of current necessary to actuate these relays TF to their picked up or westbound position. After this westbound traffic direction has thus been established, relay 2LAS is dropped away to subsequently drop relays 2L and 2LS for locking track switch SW2 in its reverse position.

Provided that track switch SW2 has been properly locked in its reverse position, and, that signal clearing relay 2LGZ is picked up, relay SB–YH of FIG. 1L is now energized by a circuit extending from (+) in FIG. 1E, through front contact 109 of relay 3T–TR, along wire 110 between FIGS. 1E and 1F, through back contacts 111 and 112 of relay 2LS and 2L respectively, front or westbound contact 118 of relay B–TF, front contacts 119, 120 and 121 of relay B–TR, 21GZ and 2RAS respectively, front contact 250 of relay 2RWC, along wire 251 between FIGS. 1F, 1K and 1L, through the front or westbound contact 252 of relay SB–TF, and to (−). In the above it is of course assumed here that the directional magnetic stick relays TF, associated with the siding track portion of siding B, have been properly positioned to their westbound or picked up position for the assumed westbound vehicle now occupying this siding track. Relay SB–GH of FIG. 1L is now also energized by its westbound energizing circuit extending from (+) in FIG. 1F, through front contact 125 of relay B–YH, along wire 126 between FIGS. 1F, 1G and 1L, through front contact 253 of relay SB–YH, front or westbound contact 254 of relay SB–TF, and to (−). With relay SB–YH and SB–GH thus both picked up, as described above, a 180 code rate is then applied to the loop circuit (not shown) for siding track section SB of FIG. 1G, so that the westbound vehicle may enter the illustrated stretch of single track.

When this westbound vehicle enters at the right-hand end of the OS section for track switch SW2, relay B–TR is then dropped away to initiate the application of a 180 vehicle control code to loop circiuts 1BTC and 3BTC of FIGS. 1F and 1G. This 180 code is applied directly to loop circuit 1BTC through front contact 142 of relay B–CP, and to loop circuit 3BTC, through back contact 255 of relay 2NWC, front contact 256 of relay 2RWC, and along wire 257 between FIGS. 1F and 1G. The westbound vehicle may now continue at its nominal high speed onto the illustrated stretch of single track, and, is thereafter controlled in accordance with the advanced conditions existing to the left or westbound in the accompanying drawings.

As mentioned previously, although certain wayside signals have been illustrated in the accompanying drawings, it should be apparent from the foregoing description of the operation of the system that these wayside signals are unnecessary, in case of unmanned vehicles, since proper vehicle entrance and exit control, for the illustrated stretch of single track, is provided by the selective application of a permissive vehicle control codes to certain of the wayside loop circuits TC, when the system of the present invention has checked that the vehicles may safely enter or exit from the illustrated stretch of single track.

Having thus described a vehicle control system as one specific embodiment of the present invention, it is to be understood that this form is selected to facilitate in the disclosure of the invention rather than to limit the number of forms which it may assume; and, it is to be further understood that various modifications, adaptations and alterations may be applied to the specific form shown to meet the requirements of practice without in any manner departing from the spirit or scope of the present invention.

What we claim is:

1. A vehicle control system for controlling the operation of vehicles in opposite directions selectively over a stretch of right of way comprising, directive means for registering a preselected direction of vehicle traffic over said stretch of right of way, detecting means responsive to the registration of said directive means for detecting advance conditions that exist on said stretch of right of way along said preselected direction of vehicle traffic and including occupancy detecting means having transmitting means on each end of a vehicle for transmitting a signal distinctive of the associated end of said vehicle and inert tuned coils on the wayside selectively responsive to said signal for detecting the location of said vehicle ends within said stretch of right of way, coding means for selectively transmitting vehicle control codes in accordance with the condition of said detecting means, loop circuit means disposed along said stretch of right of way for communicating the vehicle control codes transmitted by said coding means to vehicles traversing said stretch of right of way, receiving means on said vehicles for receiving said communicated vehicle control codes, and control means on said vehicle responsive to said received vehicle control codes for controlling the performance of said vehicles over said stretch of right of way in accordance with said vehicle control codes.

2. A vehicle control system for controlling the operation of vehicles in opposite directions over a sectional stretch of right of way comprising, directive means for registering a preselected direction of vehicle traffic over said sectional stretch of right of way, detecting means responsive to the registration of said directive means for detecting advance conditions that exist on said sectional stretch of right of way along said preselected direction of vehicle traffic and including occupancy detecting means partly on the vehicles and partly on the wayside for each section of said sectional stretch of right of way, said occupancy detecting means including inert tuned check-in and check-out coils on the wayside at the respective ends of each section of said sectional stretch of right of way selectively responsive to transmissions from said vehicle distinctive of the respective ends of said vehicles for selectively checking said vehicles into and out of said right of way sections for both directions of traffic over said sectional stretch of right of way, coding means associated with each section for selectively transmitting vehicle conrol codes in accordance with the condition of said detecting means, a loop circuit for each of said sections for communicating vehicle control codes transmitted by said coding means to a vehicle occupying the associated section of said sectional stretch of right of way, receiving means on said vehicle for receiving said communicated vehicle control codes, and control means on said vehicle responsive to said vehicle control codes for controlling the performance of said vehicles in accordance with said vehicle control codes.

3. In a system for controlling the operation of vehicles in a preselected direction over a stretch of right of way divided into a plurality of sections, a wayside loop circuit extending throughout each section for communicating predetermined control information to a vehicle travelling over said section distinctive of the desired operation of said vehicle on said section, first detecting means including first transmitting means on the leading end of a vehicle for transmitting a signal of first predetermined frequency and first circuit means on the wayside at the entrance end of each right of way tuned to be responsive to said first frequency signal for registering entrance of said vehicle into said right of way section, second detecting means including second transmitting means on the trailing end of said vehicle for transmitting a signal of second predetermined frequency and second circuit means on the wayside at the exit end of said section tuned to be responsive to said second frequency signal for registering the exit of said vehicle from said right of way section, and selective means effective to select the control information to be communicated to each vehicle by each loop circuit in accordance with the condition of the first and second detecting means for the right of way sections in advance of said vehicle.

4. In a system for controlling the operation of railway vehicles adjacent a track switch location, the combination of, a plurality of energizable loop circuits disposed on the wayside, one of said loop circuits extending along each of the possible vehicle routes over said track switch, coding means responsive to the desired operation of each vehicle travelling over said track switch for transmitting vehicle control codes distinctive of said desired vehicle operation, connecting means responsive to the position of said track switch for selectively connecting said coding means to those of said loop circuits extending along the route to be taken by a vehicle over said track switch, whereby said connected loop circuits communicate said vehicle control codes to said vehicle while travelling over said track switch, and control means on said vehicle including receiving means responsive to said communicated vehicle control codes effective to control the performance of said vehicle over said track switch.

5. In a system for controlling the operation of vehicles over a stretch of right of way divided into a plurality of sections, the combination of, a wayside loop circuit extending throughout each of said right of way sections for communicating predetermined control information to said vehicles while travelling over said sections distinctive of the desired operation of said vehicles on said right of way, first transmitting means on the leading end of each vehicle for transmitting a signal of first predetermined frequency, first wayside circuit means disposed at the entrance end of each of said right of way sections responsive to said first frequency signal for detecting the passage of said vehicle leading end at the entrance end of each of said right of way sections, second transmitting means on the trailing end of each of said vehicles for transmitting a signal of second predetermined frequency, second wayside circuit means disposed at the exit end of each of said right of way sections responsive to said second frequency signal for detecting the passage of the trailing end of said vehicles at the exit end of each of said right of way sections, selecting means responsive to the condition of said first and second wayside circuit means for selecting the vehicle control information to be communicated to each vehicle by said loop circuit dependent upon advance traffic conditions existing in the right of way sections in advance of said vehicle, and code applying means effective to initiate the application of said vehicle control codes to a given loop circuit upon detection by said first wayside circuit means that the leading end of a vehicle has entered the associated right of way section, and code terminating means effective to terminate transmission of said vehicle control codes by a given loop circuit when the leading end of said vehicle is detected at the entrance end to the next section in advance.

6. A railway vehicle control system for controlling the operation of vehicles in opposite directions over a sectional track layout made up of a sectional stretch of single track and an OS section surrounding a track switch adjacent one end of said stretch of single track whereby a plurality of routes are established into and out of said stretch of single track comprising, directive means for registering a preselected direction of vehicle traffic over said sectional track layout, detecting means responsive to the registration of said directive means and the position of said track switch for detecting advance conditions that exist throughout said sectional track layout along the designated vehicle route in said preselected direction of vehicle traffic and including occupancy detecting means for each section of said sectional track layout for detecting when the sections of said sectional track layout are occupied, coding means associated with each section of said sectional track layout for selectively transmitting vehicle control codes in accordance with the condition of said detecting means, a loop circuit for each section of said sectional track layout for communicating the vehicle control codes transmitted by said coding means to a vehicle occupying the associated section of said sectional track layout, receiving means on said vehicles for receiving said communicated vehicle control codes, and control means on said railway vehicles responsive to said received vehicle control codes for controlling the performance of said railway vehicles, over said sectional track layout, in accordance with said vehicle control codes.

References Cited by the Examiner
UNITED STATES PATENTS

| | | | |
|---|---|---|---|
| 2,378,325 | 6/1945 | Rees | 246—34 |
| 2,488,683 | 11/1949 | Reichard. | |
| 2,537,298 | 1/1951 | Baughman | 246—41 X |
| 2,681,984 | 6/1954 | Van Tassel | 246—63 X |
| 2,728,851 | 12/1955 | Shields | 246—34 X |
| 2,905,810 | 9/1959 | Ferm | 246—63 |
| 3,045,112 | 7/1962 | Hailes | 246—8 X |
| 3,112,908 | 12/1963 | Hailes | 246—34 X |

ARTHUR L. LA POINT, *Primary Examiner.*

JAMES S. SHANK, EUGENE G. BOTZ, *Examiners.*